(12) United States Patent
Rentsch et al.

(10) Patent No.: US 9,725,600 B2
(45) Date of Patent: Aug. 8, 2017

(54) PREPARATION OF PIGMENTS

(71) Applicant: Omya International AG, Oftringen (CH)

(72) Inventors: Samuel Rentsch, Aarburg (CH); Daniel E. Gerard, Basel (CH); Matthias Buri, Rothrist (CH); Patrick A. C. Gane, Rothrist (CH); Vesa Kukkamo, Hyvinkää (FI)

(73) Assignee: Omya International AG, Oftringen (CH)

( * ) Notice: Subject to any disclaimer, the term of this patent is extended or adjusted under 35 U.S.C. 154(b) by 109 days.

(21) Appl. No.: 14/380,431

(22) PCT Filed: Mar. 21, 2013

(86) PCT No.: PCT/EP2013/055895
§ 371 (c)(1),
(2) Date: Aug. 22, 2014

(87) PCT Pub. No.: WO2013/139889
PCT Pub. Date: Sep. 26, 2013

(65) Prior Publication Data
US 2015/0059999 A1  Mar. 5, 2015

Related U.S. Application Data

(60) Provisional application No. 61/617,721, filed on Mar. 30, 2012.

(30) Foreign Application Priority Data

Mar. 23, 2012 (EP) ..................... 12161144

(51) Int. Cl.

| C09C 1/02 | (2006.01) |
|---|---|
| C08K 3/26 | (2006.01) |
| C09D 129/04 | (2006.01) |
| C09D 139/04 | (2006.01) |
| C09C 3/10 | (2006.01) |
| D21H 17/66 | (2006.01) |
| D21H 17/67 | (2006.01) |
| D21H 19/38 | (2006.01) |
| D21H 17/00 | (2006.01) |

(52) U.S. Cl.
CPC .............. *C09C 1/021* (2013.01); *C08K 3/26* (2013.01); *C09C 3/10* (2013.01); *C09D 129/04* (2013.01); *C09D 139/04* (2013.01); *D21H 17/00* (2013.01); *D21H 17/66* (2013.01); *D21H 17/675* (2013.01); *D21H 19/385* (2013.01); *C01P 2004/61* (2013.01); *C01P 2004/62* (2013.01); *C01P 2006/22* (2013.01); *C08K 2003/265* (2013.01)

(58) Field of Classification Search
USPC ..... 162/158, 168.1, 181.1, 181.2; 524/1, 53, 524/425, 543; 106/400, 401, 463, 464, 106/465, 471
See application file for complete search history.

(56) References Cited

U.S. PATENT DOCUMENTS

| 5,278,248 | A | 1/1994 | Egraz et al. | |
|---|---|---|---|---|
| 5,798,425 | A | 8/1998 | Albrecht et al. | |
| 6,387,176 | B1* | 5/2002 | Widmer | C04B 24/2647 |
| | | | | 106/696 |
| 6,777,517 | B1 | 8/2004 | Albrecht et al. | |
| 6,855,752 | B2* | 2/2005 | Velten | C04B 24/2658 |
| | | | | 524/425 |
| 6,946,510 | B2* | 9/2005 | Suau | B01F 17/0028 |
| | | | | 106/465 |
| 2003/0045647 | A1 | 3/2003 | Suau et al. | |
| 2004/0019148 | A1 | 1/2004 | Suau et al. | |
| 2005/0143511 | A1 | 6/2005 | Suau et al. | |
| 2009/0199741 | A1 | 8/2009 | Bleibler et al. | |
| 2010/0025507 | A1 | 2/2010 | Buri et al. | |
| 2011/0158890 | A1* | 6/2011 | Gane | C01F 11/183 |
| | | | | 423/432 |
| 2011/0281042 | A1 | 11/2011 | Wild | |
| 2012/0016061 | A1 | 1/2012 | Gane et al. | |
| 2012/0217327 | A1 | 8/2012 | Buri et al. | |
| 2012/0318895 | A1 | 12/2012 | Buri et al. | |
| 2013/0130046 | A1 | 5/2013 | Guillot et al. | |

FOREIGN PATENT DOCUMENTS

| EP | 0736553 | A2 | 10/1996 |
|---|---|---|---|
| EP | 1136508 | A1 | 9/2001 |
| EP | 1136897 | A2 | 9/2001 |
| FR | 2913427 | A1 | 9/2008 |
| JP | 5689827 | A | 7/1981 |
| JP | 2005280096 | A | 10/2005 |
| TW | 201035412 | A | 10/2010 |
| WO | 9906219 | A1 | 2/1999 |
| WO | 0077058 | A1 | 12/2000 |
| WO | 2009012912 | A1 | 1/2009 |
| WO | 2009095697 | A1 | 8/2009 |
| WO | 2011014199 | A1 | 2/2011 |

(Continued)

OTHER PUBLICATIONS

"What is Viscosity," pp. 5-9, [onlone][retrieved on Mar. 21, 2006] Retrieved from the Internet: <URL: http://www.brookfieldengineering.com/education/what-is-viscosity.asp>.*

(Continued)

*Primary Examiner* — Dennis Cordray

(74) *Attorney, Agent, or Firm* — Amster, Rothstein & Ebenstein LLP

(57) ABSTRACT

The present invention relates to an aqueous calcium carbonate containing composition, to methods for producing such aqueous calcium carbonate containing compositions and to the use of the aqueous calcium carbonate containing composition in paper, paper coating, plastics and/or paint applications and as filler in paper.

32 Claims, 4 Drawing Sheets

(56) References Cited

FOREIGN PATENT DOCUMENTS

WO      2011019866 A1      2/2011
WO      2013072586 A1      5/2013

OTHER PUBLICATIONS

International Search Report dated Apr. 22, 2013 for PCT Application No. PCT/EP2013/055895.
Written Opinion of the International Searching Authority dated Apr. 22, 2013 for PCT Application No. PCT/EP2013/055895.
Office Action dated Nov. 4, 2015 for Japanese Application No. 2015-500922.

\* cited by examiner

PREPARATION OF PIGMENTS

CROSS-REFERENCE TO RELATED APPLICATIONS

This application is a U.S. national phase of PCT Application No. PCT/EP2013/055895, filed Mar. 21, 2013, which claims priority to European Application No. 12161144.6, filed Mar. 23, 2012 and U.S. Provisional Application No. 61/617,721, filed Mar. 30, 2012.

The present invention relates to an aqueous calcium carbonate containing composition, to methods for producing such aqueous calcium carbonate containing compositions and to the use of the aqueous calcium carbonate containing composition in paper, paper coating, plastics and/or paint applications and as filler in paper.

In practice, aqueous preparations and especially suspensions of water-insoluble solids such as calcium carbonate containing materials are used extensively in the paper, paint, rubber and plastics industries as coatings, fillers, extenders and pigments for papermaking as well as aqueous lacquers and paints. For example, suspensions or slurries of calcium carbonate, talc or kaolin are used in the paper industry in large amounts as filler and/or as a component in the preparation of coated paper. Typical aqueous preparations of water-insoluble solids are characterized in that they comprise water, a water-insoluble solid compound and optionally further additives, such as dispersing agents, in the form of a suspension or slurry. Water-soluble polymers and copolymers which may be used as e.g. dispersant and/or grinding aid in such preparation are, for example, described in U.S. Pat. No. 5,278,248.

In particular, calcium carbonate containing compositions are widely used in coating colour formulations suitable as support on paper products. Such paper products are used for multiple purposes such as inkjet digital printing, flexo, rotogravure and offset printing etc. However, especially the adjustment of optical and mechanical properties for coating colour compositions used as support on paper for inkjet printing applications is a challenge because the ink is printed wet and must thus quickly drains away into the body of the base paper but at the same time must provide suitable printing quality resulting in bright and intense colours and minimal print bleed. Furthermore, the inkjet technology is used in high volume commercial applications such as for the production of magazines, newspapers, textbooks etc. and must thus be suitable for continuous paper feeding transport systems that enable fast and high-volume printing.

In this regard, several approaches for improving the mechanical and/or optical properties of coating colour composition used as support on paper have been proposed. For example, WO 99/06219 A1 relates to a composition useful for surface treating a sheet substrate for ink jet printing, the composition comprising a salt of a divalent metal, the salt being soluble in an aqueous sizing medium at about pH 7 to about pH 9, the aqueous sizing medium further comprising a carrier agent and a sizing agent.

US 2011/0281042 A1 refers to a method for making printing paper comprising preparing an ink receiving surface coating composition which comprises an optical brightening agent (OBA), polyvinyl alcohol (PVOH) and a water soluble divalent salt, wherein the PVOH and OBA are added to the coating prior to the salt, and applying said coating composition onto at least one surface of said paper; and a surface coating composition which comprises a protected OBA and a water soluble divalent salt.

WO 2009/095697 A1 relates to a coated sheet product especially useful in conjunction with inkjet printers comprises a substrate carrying a coating on at least one surface, characterised in that the coating includes (i) a pigment comprising calcium carbonate; (ii) a binder for component (i) comprising a major proportion of a polymer carrying —O—, —CO—, —OCO— and/or —COO— groups in its side-chains; and (iii) at least at the surface of said coating, a water-soluble salt of a Group II, Group III or transition metal.

WO 2009/012912 A1 refers to an ink jet paper as well as a method for its manufacture is disclosed comprising at least one image receiving coating layer and at least one pre-coat layer beneath said image receiving coating layer on a paper substrate, wherein the pre-coat layer comprises 100 parts in dry weight of a pigment part consisting of 20-75 parts in dry weight of a fine particulate calcium carbonate and/or kaolin; 10-70 parts in dry weight of at least one fine particulate silica and/or of a fine particulate ground calcium carbonate with surface and internal structure modification as a result of treatment with one or more medium to strong $H_3O^+$ ion providers and optionally with additional treatment of gaseous carbon dioxide; and 0-30 parts of additional fine particulate pigments 4-20 parts in dry weight of a binder part 0-6 parts in dry weight of additives; and the image receiving coating layer comprises 100 parts in dry weight of a pigment part consisting of 50-100 parts in dry weight of at least one fine particulate silica; 0-50 parts in dry weight of a fine particulate polymer pigment; and 0-30 parts of additional fine particulate pigments 2-10 parts in dry weight of a binder 0-3 parts in dry weight of additives.

WO 2011/019866 A1 relates to an inkjet recording medium and a coating composition for forming an inkjet recording medium. In particular, the paper coating includes a combination of a primary pigment and a secondary pigment.

US 2004/019148 A1 relates to the use of a slightly anionic and water-soluble copolymer, as a dispersing agent and/or an agent for assisting the grinding of pigments and/or mineral fillers in aqueous suspension giving on the one hand a low Zeta potential to the aqueous suspensions of the said fillers and/or pigments and on the other hand affording an electrosteric stabilisation of the said suspensions.

WO 99/06219 A1 relates to a composition useful for surface treating a sheet substrate for ink jet printing, the composition comprising a salt of a divalent metal, the salt being soluble in an aqueous sizing medium at about pH 7 to about pH 9, the aqueous sizing medium further comprising a carrier agent and a sizing agent.

In particular, the use of calcium chloride in aqueous compositions comprising calcium carbonate containing materials for enhancing the printing quality such as gloss, print density and mottle, in inkjet printing suffers from a specific drawback.

In this regard, in the preparation of aqueous compositions of calcium carbonate containing materials, the skilled person is often required to select and introduce additives in order to regulate one or more characteristics of these compositions. For example, high solid content aqueous compositions can only be processed if a corresponding dispersant is added.

The addition of a dispersant such as a sodium polyacrylate or sodium polyphosphate inter alia affects the surface charge of the calcium carbonate particles in the aqueous composition in that it generates negative charges on the particles.

However, such dispersed calcium carbonate comprising aqueous composition in combination with calcium chloride can cause serious problems during the production of the coating colour composition, its storage, and subsequent use. If such a calcium carbonate comprising aqueous composition comprising negatively charged solid particles comes in contact with calcium chloride or other divalent or trivalent salts, the formation of agglomerated and flocculated particles in the aqueous composition occurs which may lead to unwanted effects such as a severe viscosity increase and/or partial dissolution of acid sensitive material in the composition.

This problem is getting worse with increasing content of calcium carbonate and/or calcium chloride in the aqueous composition, and is especially pronounced in calcium carbonate comprising aqueous compositions having high solids content, i.e. compositions having solids content of more than 45 wt.-% based on the total weight of the composition.

Therefore, there is a continuous need for alternative aqueous calcium carbonate containing compositions which provide a better performance than existing aqueous calcium carbonate containing compositions and effectively enhance the mechanical and optical properties of a corresponding paper product coated with such a composition.

Accordingly, it is an objective of the present invention to provide an aqueous calcium carbonate containing composition suitable as support on paper for inkjet printing applications. A further objective of the present invention is to provide an aqueous calcium carbonate containing composition for coating colour formulations suitable as support on paper for inkjet printing applications, especially enabling fast and high-volume printing. Another objective of the present invention is to provide an aqueous calcium carbonate containing composition comprising a relatively high amount of a salt of a divalent or trivalent cation providing a high printing quality. A still further objective is to provide an aqueous calcium carbonate containing composition which does not affect the other physical properties of the suspension, such as the mechanical properties, in an unacceptable way.

An even further objective is to provide an aqueous calcium carbonate containing composition that ensures a good balance of mechanical and optical properties. Another objective of the present invention is to provide an aqueous calcium carbonate containing composition which not only reduces or prevents the formation of agglomerated and flocculated particles in the composition, but also maintains a sufficient viscosity for the aqueous calcium carbonate containing composition.

The foregoing and other objectives are solved by an aqueous calcium carbonate containing composition comprising
  a) a calcium carbonate containing material in an amount of at least 10 wt.-%, based on the total dry weight of the composition,
  b) at least one anionically charged comb polymer having a specific charge of −5 to −500 C/g at pH 8,
  c) optionally at least one binding agent in an amount of at least 2.5 wt.-%, based on the total dry weight of the composition, and
  d) at least one salt of a divalent or trivalent cation in an amount of between 1 and 20 wt.-%, based on the total dry weight of the composition, whereby at least 95 wt.-% of the total amount of salt is dissolved within the composition and
wherein the composition has a Brookfield viscosity of below 2500 mPa·s at 25° C.

For the purpose of the present invention, the term "calcium carbonate containing material" refers to a material that comprises at least 80 wt.-% calcium carbonate, based on the total dry weight of the calcium carbonate containing material.

For the purpose of the present invention, the term anionically charged "comb polymer" refers to a comb-shaped polymer which is formed from a main chain, also referred to as back bone, to which carbonic acid groups and/or other acid groups are attached in the form of free acids or salts thereof, i.e. in a form of a carboxylate ion, as well as side chains comprising polyalkylene oxide, optionally end-caped with a hydrocarbon chain. The polyalkylene oxide side chains can be bonded to the main chain via ester bonds, amide bonds, or ether bonds. In addition to the carbonic acid groups and the polyalkylene oxide side chains, further functional or non-functional groups can be bonded to the main chain, e.g. positively charged functional groups such as a quaternary ammonium group.

The term "anionically charged" as used in the present invention is to be understood to mean that the comb polymer has a total or net charge that is negative, i.e. the sum of all positive and negative charges is negative. In other words, the polymer must possess an excess of anionically charged functional groups or residues. This means that the anionically charged comb polymer of the present invention may comprise both positively and negatively charged functional groups or residues, i.e. cationic and anionic functional groups or residues, as long as the total or net charge is negative, i.e. the comb polymer is anionic. For example, the anionically charged comb polymer may comprise only anionically charged functional groups or residues or may comprise anionically and cationically charged functional groups or residues, and thus may have an amphoteric character.

The term "specific charge" refers to the amount of electric charges in a specific amount of a polymer and is specified in C/g at a pH value of 8. The specific charge can be determined by titration with a cationic polymer until the specific charge becomes zero at a pH value of 8.

The term "dry" is understood to be a calcium carbonate containing material having less than 0.3% by weight of water relative to the weight of the calcium carbonate containing material. The % water is determined according to the Coulometric Karl Fischer measurement method, wherein the calcium carbonate containing material is heated to 220° C., and the water content released as vapour and isolated using a stream of nitrogen gas (at 100 ml/min) is determined in a Coulometric Karl Fischer unit.

According to another aspect of the present invention, a method for producing an aqueous calcium carbonate containing composition is provided, comprising the steps of
  a) providing water,
  b) providing a calcium carbonate containing material,
  c) providing at least one anionically charged comb polymer having a specific charge of −5 to −500 C/g at pH 8,
  d) optionally providing at least one binding agent in an amount of at least 2.5 wt.-%, based on the total dry weight of the composition,
  e) providing at least one salt of a divalent or trivalent cation, in an amount of between 1 and 20 wt.-%, based on the total dry weight of the composition, whereby at least 95 wt.-% of the total amount of salt is dissolved within the composition and
  f) contacting the calcium carbonate containing material of step b) with the water of step a), g) contacting the calcium carbonate containing material of step b) with the at least one anionically charged comb polymer of step c) before and/or during and/or after step f), h) optionally contacting the calcium carbonate containing material of step b) with the at least one binding agent of step d) before and/or during and/or after step f) and/or before and/or during and/or after step g), and i) contacting the calcium carbonate containing material of step b) with the at least one salt of divalent or trivalent cation of step e) before or after step g), preferably after step g).

According to still another aspect of the present invention, a method for producing an aqueous calcium carbonate containing composition is provided, comprising the steps of a) providing water,
b) providing a calcium carbonate containing material,
c) providing at least one anionically charged comb polymer having a specific charge of −5 to −500 C/g at pH 8,
d) optionally providing at least one binding agent in an amount of at least 2.5 wt.-%, based on the total dry weight of the composition,
e) providing at least one salt of divalent or trivalent cation, in an amount of between 1 and 20 wt.-%, based on the total dry weight of the composition, whereby at least 95 wt.-% of the total amount of salt is dissolved within the composition,
f) combining the water of step a), the calcium carbonate containing material of step b) and the at least one anionically charged comb polymer of step c) in any order to form a suspension,
g) dispersing and/or grinding the suspension obtained in step f),
h) optionally contacting the calcium carbonate suspension obtained in step g) with the at least one binding agent of step d),
i) contacting the calcium carbonate suspension obtained in step g) with the at least one salt of a divalent or trivalent cation of step e) after step g) or contacting the calcium carbonate suspension of step h) with the at least one salt of a divalent or trivalent cation of step e) after step h).

According to another aspect of the present invention, a method for producing an aqueous calcium carbonate containing composition is provided, comprising the steps of a) providing water,
b) providing a calcium carbonate containing material,
c) providing at least one anionically charged comb polymer having a specific charge of −5 to −500 C/g at pH 8,
d) providing at least one salt of a divalent or trivalent cation in an amount between 10 to 50 wt.-%, based on the total dry weight of the at least one anionically charged comb polymer of step c),
e) optionally providing at least one binding agent in an amount of at least 2.5 wt.-%, based on the total dry weight of the composition,
f) combining the at least one anionically charged comb polymer of step c) and the at least one salt of a divalent or trivalent cation of step d),
g) contacting the calcium carbonate containing material of step b) with the water of step a),
h) contacting the calcium carbonate containing material of step b) with the at least one anionically charged comb polymer of step f) before and/or during and/or after step g),
i) optionally contacting the calcium carbonate containing material of step b) with the at least one binding agent of step e) before and/or during and/or after step g) and/or before and/or during and/or after step h).

According to still another aspect of the present invention, a method for producing an aqueous calcium carbonate containing composition is provided, comprising the steps of a) providing water,
b) providing a calcium carbonate containing material,
c) providing at least one anionically charged comb polymer having a specific charge of −5 to −500 C/g at pH 8,
d) providing at least one salt of a divalent or trivalent cation in an amount between 10 to 50 wt.-%, based on the total dry weight of the at least one anionically charged comb polymer of step c),
e) optionally providing at least one binding agent in an amount of at least 2.5 wt.-%, based on the total dry weight of the composition,
f) combining the at least one anionically charged comb polymer of step c) and the at least one salt of a divalent or trivalent cation of step d),
g) combining the water of step a), the calcium carbonate containing material of step b) and the at least one anionically charged comb polymer of step f) in any order to form a suspension,
h) dispersing and/or grinding the suspension obtained in step g),
i) optionally contacting the calcium carbonate suspension of step h) with the at least one binding agent of step e).

It is preferred that the calcium carbonate containing material of step b) is contacted with further additives such as fixation aids like cationic homopolymers based on monomer units of diallyl dialkyl ammonium salts or polyethylene imines. It is further preferred that the composition has a solids content from 10 to 70 wt.-%, preferably from 20 to 65 wt.-%, more preferably from 25 to 60 wt.-%, based on the total dry weight of the composition. It is also preferred that the Brookfield viscosity of the composition is from 50 to 2500 mPa·s at 25° C., preferably from 25 to 2000 mPa·s at 25° C., more preferably from 25 to 1500 mPa·s at 25° C. and most preferably from 150 to 2000 mPa·s at 25° C.

According to still another aspect of the present invention, the use of the aqueous calcium carbonate containing composition in paper, paper coating, plastic and/or paint applications is provided. According to still another aspect of the present invention, the use of the aqueous calcium carbonate containing composition as filler in paper is provided. It is preferred that the aqueous calcium carbonate containing composition is used as a support for inkjet digital printing, flexo, rotogravure and/or offset, preferably for inkjet digital printing.

Advantageous embodiments of the present invention are defined in the corresponding sub-claims.

According to one embodiment of the present invention, the at least one anionically charged comb polymer has an intrinsic viscosity in the range of 5 to 500 ml/g, preferably in the range of 10 to 400 ml/g and most preferably in the range of 20 to 300 ml/g.

According to another embodiment of the present invention, the at least one anionically charged comb polymer has a specific charge from −10 C/g to −500 C/g at pH 8, preferably from −10 C/g to −300 C/g at pH 8, more preferably from −10 C/g to −150 C/g at pH 8, even more preferably from −10 C/g to −135 g/C at pH 8, and most preferably from −10 C/g to −100 C/g at pH 8.

According to yet another embodiment of the present invention, wherein the at least one anionically charged comb polymer comprises structural units of formula (I)

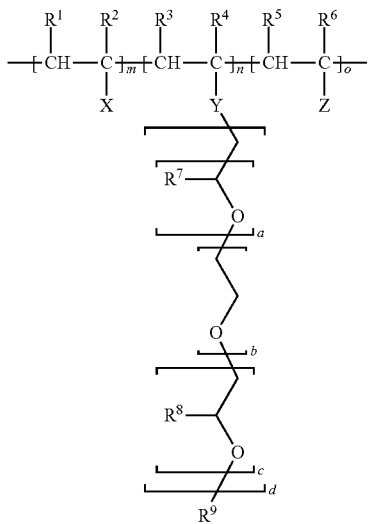

wherein $R^1$, $R^2$, $R^3$, $R^4$, $R^5$ and $R^6$ are independently selected from hydrogen or alkyl groups, preferably having 1 to 40 carbon atoms,
X is a negatively charged functional group,
Y represents a functional linkage group, which is independently selected from the group consisting of ether, ester, urethane and amide groups,
Z is a positively charged functional group,
$R^7$ and $R^8$ are independently selected from hydrogen or alkyl groups having 1 to 4 carbon atoms,
$R^9$ is selected from hydrogen or an alkyl group having 1 to 40 carbon atoms,
a, b, c and d are integers having a value from 5 to 150, and at least one of a, b, c or d has a value of greater than 0, and n, m and o are selected such that the anionically charged polymer has a specific charge from −5 C/g to −500 C/g at pH 8.

According to one embodiment of the present invention, the at least one anionically charged comb polymer comprises
a) 5 wt.-% to 40 wt.-%, preferably 5 wt.-% to 20 wt.-%, based on the total amount of monomers, of (meth)acrylic acid,
b) 60 wt.-% to 95 wt.-%, preferably 80 wt.-% to 95 wt.-%, based on the total amount of monomers, of at least one monomer of Formula (II)

wherein R is a polymerizable functional group selected from methacrylate or methacryl-urethane,
OE and OP designates ethylene oxide and propylene oxide, respectively, α and β are integers each having a value from 0 to 150 and at least one of α or β has a value of greater than 0,
R' represents hydrogen or an alkyl group having 1 to 4 carbon atoms.

According to another embodiment of the present invention, the composition comprises the at least one anionically charged comb polymer in an amount from 0.01 to 10 wt.-%, based on the total dry weight of the composition, preferably from 0.05 to 5 wt.-%, more preferably from 0.1 to 3 wt.-%, even more preferably from 0.15 to 2.5 wt.-% and most preferably from 0.2 to 2 wt.-% or from 0.15 to 1.75 wt.-%.

According to yet another embodiment of the present invention, the calcium carbonate containing material is a ground calcium carbonate, a precipitated calcium carbonate, a modified calcium carbonate or a mixture thereof.

According to one embodiment of the present invention, the calcium carbonate containing material has a weight median particle size $d_{50}$ from 0.1 to 100 μm, from 0.25 to 50 μm, or from 0.3 to 5 μm, preferably from 0.4 to 3.0 μm.

According to another embodiment of the present invention, the composition comprises the calcium carbonate containing material in an amount from 10 to 70 wt.-%, preferably from 20 to 65 wt.-%, more preferably from 25 to 60 wt.-%, based on the total dry weight of the composition.

According to yet another embodiment of the present invention, the binding agent is selected from the group comprising polyvinyl alcohol, polyvinyl acetate, starch, proteins such as casein, cellulose and cellulosic derivatives such as ethylhydroxyethyl cellulose and/or carboxymethyl cellulose, and mixtures thereof, preferably the binding agent is selected from polyvinyl alcohol and polyvinyl acetate.

According to one embodiment of the present invention, the composition comprises the at least one binding agent in an amount between 2.5 and 20 wt.-%, based on the total dry weight of the composition, preferably between 5 and 17 wt.-% and most preferably between 12 and 16 wt.-%.

According to another embodiment of the present invention, the at least one salt of a divalent or trivalent cation is selected from a chloride salt of a divalent or trivalent cation, a bromide salt of a divalent or trivalent cation, a sulfate salt of a divalent or trivalent cation and mixtures thereof, preferably a chloride salt of a divalent or trivalent cation.

According to yet another embodiment of the present invention, the at least one salt of a divalent or trivalent cation is a chloride salt of a divalent or trivalent cation selected from the group comprising calcium chloride, magnesium chloride, strontium chloride, zinc chloride, manganese chloride and mixtures thereof, preferably calcium chloride.

According to one embodiment of the present invention, the composition comprises the at least one salt of a divalent or trivalent cation in an amount of between 3 and 17 wt.-%, based on the total dry weight of the composition, whereby at least 95 wt.-% of the total amount of salt is dissolved within the composition, more preferably between 5 and 15 wt.-% whereby at least 95 wt.-% of the total amount of salt is dissolved within the composition, even more preferably between 6 and 13 wt.-% whereby at least 95 wt.-% of the total amount of salt is dissolved within the composition and most preferably between 7 and 12 wt.-% whereby at least 95 wt.-% of the total amount of salt is dissolved within the composition.

According to another embodiment of the present invention, the composition comprises further additives such as fixation aids like cationic homopolymers based on monomer units, such as diallyl dialkyl ammonium salts and polyethylene imines.

According to another embodiment of the present invention, the composition has solids content from 10 to 70 wt.-%, preferably from 20 to 65 wt.-%, more preferably from 25 to 60 wt.-%, based on the total dry weight of the composition.

According to yet another embodiment of the present invention, the Brookfield viscosity of the composition is from 50 to 2500 mPa·s at 25° C., preferably from 25 to 2000 mPa·s at 25° C., more preferably from 25 to 1500 mPa·s at 25° C. and most preferably from 150 to 2000 mPa·s at 25° C.

In the following, it is referred to further details of the present invention and especially the foregoing components of the aqueous calcium carbonate containing composition.

One specific requirement of the present invention is that the aqueous calcium carbonate containing composition comprises a calcium carbonate containing material in an amount of at least 10 wt.-%, based on the total dry weight of the composition.

According to one embodiment of the present invention, the calcium carbonate containing material is a ground calcium carbonate, a precipitated calcium carbonate, a modified calcium carbonate or a mixture thereof.

"Ground calcium carbonate" (GCC) in the meaning of the present invention is a calcium carbonate obtained from natural sources, such as limestone, marble, calcite or chalk, and processed through a wet and/or dry treatment such as grinding, screening and/or fractionating, for example by a cyclone or classifier.

A ground calcium carbonate (GCC) may feature, e.g. one or more of marble, limestone, chalk, and/or dolomite. According to one embodiment of the present invention the GCC is obtained by dry grinding. According to another embodiment of the present invention the GCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case calcium carbonate containing material comprises a wet ground calcium carbonate containing material, the grinding step may be performed under conditions such that autogenous grinding takes place and/or by horizontal ball milling, and/or other such processes known to the skilled man. The wet processed ground calcium carbonate containing material thus obtained may be washed and dewatered by well known processes, e.g. by flocculation, filtration or forced evaporation prior to drying. The subsequent step of drying may be carried out in a single step such as spray drying, or in at least two steps. It is also common that such a calcium carbonate material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be vaterite, calcite or aragonite.

A precipitated calcium carbonate (PCC) may feature, e.g. one or more of aragonitic, vateritic and/or calcitic mineralogical crystal forms. Aragonite is commonly in the acicular form, whereas vaterite belongs to the hexagonal crystal system. Calcite can form scalenohedral, prismatic, spheral and rhombohedral forms. PCC can be produced in different ways, e.g. by precipitation with carbon dioxide, the lime soda process, or the Solvay process in which PCC is a by-product of ammonia production. The obtained PCC slurry can be mechanically dewatered and dried.

"Modified calcium carbonate" (MCC) in the meaning of the present invention may feature a natural ground or precipitated calcium carbonate with an internal structure modification or a surface-reaction product. According to a preferred embodiment of the present invention, the modified calcium carbonate is a surface-reacted calcium carbonate.

It is preferred that the at least one calcium carbonate containing material comprises ground calcium carbonate (GCC).

In one preferred embodiment of the present invention, the calcium carbonate containing material comprises a mixture of ground calcium carbonate and a precipitated calcium carbonate or a modified calcium carbonate.

In addition to calcium carbonate, the calcium carbonate containing material may comprise further metal oxides such as titanium dioxide and/or aluminium trioxide, metal hydroxides such as aluminium tri-hydroxide, metal salts such as sulfates, silicates such as talc and/or kaolin clay and/or mica, carbonates such as magnesium carbonate and/or gypsum, satin white and mixtures thereof.

According to one embodiment of the present invention, the amount of calcium carbonate in the calcium carbonate containing material is at least 80 wt.-%, e.g. at least 95 wt.-%, preferably between 97 and 100 wt.-%, more preferably between 98.5 and 99.95 wt.-%, based on the total dry weight of the calcium carbonate containing material.

Additionally or alternatively, the composition comprises the calcium carbonate containing material in an amount from 10 to 70 wt.-%, preferably from 20 to 65 wt.-%, more preferably from 25 to 60 wt.-%, based on the total dry weight of the composition.

According to one embodiment of the present invention, the calcium carbonate containing material has a weight median particle size $d_{50}$ from 0.1 to 100 µm, from 0.25 to 50 µm, or from 0.3 to 5 µm, preferably from 0.4 to 3.0 µm, as measured by Sedigraph 5120.

Throughout the present document, the "particle size" of a calcium carbonate material is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ value between 0.4 and 2 µm, a Sedigraph 5120 device from the company Micromeritics, USA, can be used.

Another requirement of the present invention is that the aqueous calcium carbonate containing composition comprises at least one anionically charged comb polymer having a specific charge of −5 to −500 C/g at pH 8.

The anionically charged comb polymer is a comb-shaped polymer which is formed from a main chain, also referred to as back bone, and at least one side chain attached thereto.

Without being bound to any theory, it is believed that the anionically charged comb polymer is adsorbed to the weakly positively charged calcium carbonate particles due to its negatively charged main chain, also called polymer back bone. Furthermore, the side chains of the adsorbed anionically charged comb polymer cause a steric and/or osmotic repulsion between the particles, which may lead to a steric and/or osmotic stabilization of the calcium carbonate containing material slurry.

The expression "at least one" anionically charged comb polymer means that one or more anionically charged comb polymers may be used in the aqueous calcium carbonate containing composition.

According to one preferred embodiment of the present invention, only one anionically charged comb polymer is used in the aqueous composition comprising the calcium carbonate containing material. According to another embodiment of the present invention, a mixture of at least two anionically charged comb polymers is used in the aqueous composition comprising the calcium carbonate containing material.

In particular, it is required that the at least one anionically charged comb polymer has a specific charge of −5 to −500 C/g at pH 8. It is preferred that the at least one anionically charged comb polymer has a specific charge from −10 C/g to −500 C/g at pH 8, preferably from −10 C/g to −300 C/g at pH 8 and most preferably from −10 C/g to −150 C/g at pH 8. For example, the at least one anionically charged comb polymer has a specific charge from −10 C/g to −135 g/C at pH 8 or from −10 C/g to −100 C/g at pH 8.

In one preferred embodiment of the present invention, the at least one anionically charged comb polymer has a specific charge from −20 C/g to −100 C/g at pH 8, preferably from −30 C/g to −100 C/g at pH 8 and most preferably from −30 C/g to −100 C/g at pH 8.

Additionally or alternatively, the at least one anionically charged comb polymer features an intrinsic viscosity in the range of 5 to 500 ml/g, preferably in the range of 10 to 400 ml/g and most preferably in the range of 20 to 300 ml/g.

For example, the at least one anionically charged comb polymer features an intrinsic viscosity in the range of 20 to 200 ml/g, preferably in the range of 20 to 100 ml/g and most preferably in the range of 20 to 50 ml/g.

In particular, it is preferred that the at least one anionically charged comb polymer has a specific charge of −5 to −500 C/g at pH 8 and an intrinsic viscosity in the range of 5 to 500 ml/g. It is further preferred that the at least one anionically charged comb polymer has a specific charge from −10 C/g to −500 C/g at pH 8 and an intrinsic viscosity in the range of 10 to 400 ml/g. It is even further preferred that the at least one anionically charged comb polymer has a specific charge from −10 C/g to −300 C/g at pH 8 and an intrinsic viscosity in the range of 20 to 300 ml/g.

In one preferred embodiment of the present invention, the at least one anionically charged comb polymer has a specific charge from −20 C/g to −100 C/g at pH 8 and an intrinsic viscosity in the range of 20 to 200 ml/g, preferably the at least one anionically charged comb polymer has a specific charge from −30 C/g to −100 C/g at pH 8 and an intrinsic viscosity in the range of 20 to 100 ml/g and most preferably the at least one anionically charged comb polymer has a specific charge from −30 C/g to −100 C/g at pH 8 and an intrinsic viscosity in the range of 20 to 50 ml/g.

The main chain of the at least one anionically charged comb polymer may comprise copolymers of unsaturated mono- or dicarbonic acids or other acids, unsaturated carbonic acid esters, unsaturated carbonic acid amides, allyl esters or vinyl ethers.

In general, the at least one anionically charged comb polymer used according to the present invention may be obtained by copolymerization of unsaturated mono or dicarbonic acids with unsaturated carbonic acid esters, unsaturated carbonic acid amides, allyl ethers or vinyl ethers, wherein the carbonic acids may be present in the form of the free acids and/or in the form of the salts thereof.

The side chains of the anionically charged comb polymer may comprise polymerized epoxide-containing compounds, such as, for example, ethylene oxide, propylene oxide, 1-butylene oxide, phenyl-ethylene oxide etc. It is preferred that the polyether side chains comprise polyethylene oxide or polypropylene oxide or a mixed copolymer comprising ethylene oxide and propylene oxide and have at their free end a hydroxyl group, a primary amino group or an alkyl group having between 1 and 40 carbon atoms, being straight-chain, branched or cyclical, preferably a straight chain alkyl group having between 1 and 4 carbon atoms. The carbonic acid groups or other acid groups in the polymer can be partially or fully neutralized by alkali metals or alkaline earth metals or salts of other two or three valence electron metal ions, ammonium ions, organic ammonium groups or mixtures thereof.

Anionically charged comb polymers that may be suitable in the present invention are described in US 2009/0199741 A1, U.S. Pat. No. 6,387,176 B1, EP 1136508 A1, EP 1138697 A1, EP 1189955 A1, and EP 0736553 A1. These documents disclose processes to produce anionically charged comb polymer as well as their use in mineral based binders such as cement. Suitable anionically charged comb polymer are also described in the product brochure "SIKA ViscoCrete®, selbstverdickender Beton SCC" available on the website www.sika.ch.

Examples of anionically charged comb polymers that may be used in the aqueous calcium carbonate containing composition of the present invention are polymers of the MEL-FLUX® or MelPers® series, e.g. MelPers® 2450 by BASF (Trostberg, Germany), ETHACRYL® M dispersant by CoAtex, LLC (Chester, S.C.), or MIGHTY EG® dispersant by Kao Specialties Americas, LLC, (High Point, N.C.).

According to one embodiment the at least one anionically charged comb polymer comprises structural units of formula (I)

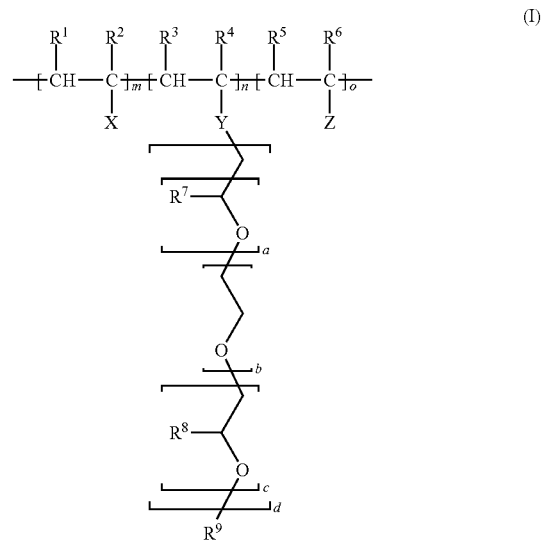

wherein $R^1$, $R^2$, $R^3$, $R^4$, $R^5$ and $R^6$ are independently selected from hydrogen or alkyl groups, preferably having 1 to 40 carbon atoms, X is a negatively charged functional group, Y represents a functional linkage group, which is independently selected from the group consisting of ethers, esters, urethanes and amides, Z is a positively charged functional group,
$R^7$ and $R^8$ are independently selected from hydrogen or alkyl groups having 1 to 4 carbon atoms,
$R^9$ is selected from hydrogen or an alkyl group having 1 to 40 carbon atoms,
a, b, c, and d are integers having a value from 5 to 150, and at least one of a, b, c or d has a value of greater than 0, and n, m and o are selected such that the anionically charged polymer has a specific charge from −5 C/g to −500 C/g at pH 8.

Examples for alkyl groups having 1 to 40 carbon atoms are methyl, ethyl, n-propyl, isopropyl, n-butyl, sec.-butyl, tert.-butyl, isobutyl, n-pentyl, n-hexyl, dodecyl, octadecyl. The alkyl groups may be substituted by one or more substituents of the halogen group, e.g. F, Cl, or Br, and/or one or more substituents of the acryloxy, amino, amide, aldehyde, carboxy, cyano, epoxy, hydroxyl, ketone, methacryloxy, mercapto, phosphoric acid, sulfonic acid or vinyl groups.

According to one embodiment of the present invention, $R^1$, $R^2$, $R^3$, $R^4$, $R^5$ and $R^6$ are independently selected from hydrogen or alkyl groups having 1 to 20 carbon atoms, preferably 1 to 10 carbon atoms, and more preferably 1 to 6 carbon atoms. According to a preferred embodiment of the present invention, $R^1$, $R^2$, $R^3$, $R^4$, $R^5$ and $R^6$ are independently selected from hydrogen or methyl. According to another embodiment of the present invention $R^1$, $R^3$, $R^5$ are hydrogen. According to still another embodiment of the present invention one or more of $R^1$, $R^3$, $R^5$ is X.

According to one embodiment of the present invention X comprises ester, amide, or ether functions. According to a preferred embodiment of the present invention, X is selected from the group consisting of phosphoric acid, phosphonic acid, sulfuric acid, sulfonic acid, carboxylic acid groups and mixtures thereof.

According to one embodiment of the present invention, Y represents a functional linkage group which is independently selected from the group consisting of phosphoric ester, phosphonic ester, sulfuric ester, sulfonic ester, carboxylic ester, phosphoric amide, phosphonic amide, sulfuric amide, sulfonic amide and carboxylic amide groups.

According to one embodiment of the present invention, Z represents a quaternary ammonium group.

According to one embodiment of the present invention, $R^9$ is a linear or branched alkyl chain having 1 to 28, preferably 1 to 18, more preferably 1 to 6, and most preferably 1 to 3 carbon atoms. According to a preferred embodiment, $R^9$ is hydrogen or methyl.

According to one embodiment, a and/or b and/or c has a value from 7 to 120. According to another embodiment of the present invention, a, b, c and d are selected such that $5 \leq (a+b+c) \cdot d \leq 150$, preferably such that $10 \leq (a+b+c) \cdot d \leq 80$.

According to one embodiment of the present invention, the at least one anionically charged comb polymer comprises at least 90 Mol-% of structural units of formula (I), preferably at least 95 Mol-%, more preferably at least 98 Mol-%, and most preferably 99 Mol-%, based on the total amount of structural units of the anionically charged comb polymer. According to another embodiment of the present invention, the anionically charged comb polymer consists of structural units of formula (I).

Additionally or alternatively, the at least one anionically charged comb polymer may be selected such that it comprises
a) 5 wt.-% to 40 wt.-%, based on the total amount of monomers, of (meth)acrylic acid,
b) 60 wt.-% to 95 wt.-%, based on the total amount of monomers, of at least one monomer of Formula (II)

$$R\text{-}(OE)_\alpha\text{-}(OP)_\beta\text{-}R' \qquad (II)$$

wherein R is a polymerizable functional group selected from methacrylate or methacryl-urethane,
OE and OP represent ethylene oxide and propylene oxide, respectively, α and β are integers each having a value from 0 to 150 and at least one of α or β has a value of greater than 0,
R' represents hydrogen or an alkyl group having 1 to 4 carbon atoms.

In one preferred embodiment of the present invention, the at least one anionically charged comb polymer may be selected such that it comprises
a) 5 wt.-% to 20 wt.-%, based on the total amount of monomers, of (meth)acrylic acid,
b) 80 wt.-% to 95 wt.-%, based on the total amount of monomers, of at least one monomer of Formula (II)

$$R\text{-}(OE)_\alpha\text{-}(OP)_\beta\text{-}R' \qquad (II)$$

wherein R is a polymerizable functional group selected from methacrylate or methacryl-urethane,
OE and OP represent ethylene oxide and propylene oxide, respectively,
α and β are integers each having a value from 0 to 150 and at least one of α or β has a value of greater than 0,
R' represents hydrogen or an alkyl group having 1 to 4 carbon atoms.

It is preferred that the at least one anionically charged comb polymer comprises
a) 5 wt.-% to 40 wt.-%, preferably 5 wt.-% to 20 wt.-%, based on the total amount of monomers, of acrylic acid,
b) 60 wt.-% to 95 wt.-%, preferably 80 wt.-% to 95 wt.-%, based on the total amount of monomers, of at least one monomer of Formula (II)

$$R\text{-}(OE)_\alpha\text{-}(OP)_\beta\text{-}R' \qquad (II)$$

wherein R is a polymerizable functional group selected from methacrylate or methacryl-urethane,
OE and OP designates ethylene oxide and propylene oxide, respectively,
α and β are integers each having a value from 0 to 150 and at least one of α or β has a value of greater than 0,
R' represents hydrogen or an alkyl group having 1 to 4 carbon atoms.

It is preferred that the at least one anionically charged comb polymer comprises
a) 5 wt.-% to 40 wt.-%, preferably 5 wt.-% to 20 wt.-%, based on the total amount of monomers, of methacrylic acid,
b) 60 wt.-% to 95 wt.-%, preferably 80 wt.-% to 95 wt.-%, based on the total amount of monomers, of at least one monomer of Formula (II)

$$R\text{-}(OE)_\alpha\text{-}(OP)_\beta\text{-}R' \qquad (II)$$

wherein R is a polymerizable functional group selected from methacrylate or methacryl-urethane
OE and OP designates ethylene oxide and propylene oxide, respectively,
α and β are integers each having a value from 0 to 150 and at least one of α or β has a value of greater than 0,
R' represents hydrogen or an alkyl group having 1 to 4 carbon atoms.

According to an embodiment of the present invention, R represents a methacrylate functional group.

Examples for alkyl groups having 1 to 4 carbon atoms are methyl, ethyl, n-propyl, isopropyl, n-butyl, sec.-butyl, tert.-butyl, isobutyl. The alkyl groups may be substituted by one or more substituents of the halogen group, e.g. F, Cl, or Br, and/or one or more substituents of the acryloxy, amino, amide, aldehyde, carboxy, cyano, epoxy, hydroxyl, ketone, methacryloxy, mercapto, phosphoric acid, sulfonic acid or vinyl groups.

According to a preferred embodiment of the present invention, R' is selected from hydrogen and methyl. It is preferred that R' is hydrogen.

According to one embodiment of the present invention, $\alpha$ or $\beta$ has a value from 25 to 150, preferably from 50 to 150 and most preferably from 75 to 150. For example, $\alpha$ or $\beta$ has a value from 100 to 125. It is preferred that a has a value from 25 to 150, preferably from 50 to 150 and most preferably from 75 to 150.

If $\alpha$ has a value from 25 to 150, preferably from 50 to 150 and most preferably from 75 to 150, $\beta$ preferably has a value of 0.

According to one embodiment of the present invention, each of $\alpha$ and $\beta$ has a value from 1 to 125, preferably from 1 to 100 and most preferably from 1 to 75. For example, each of $\alpha$ and $\beta$ has a value from 10 to 50. It is preferred that $\alpha$ has a value from 1 to 100, preferably from 1 to 50 and most preferably from 1 to 25 and $\beta$ has a value from 1 to 125, preferably from 10 to 100 and most preferably from 25 to 75.

According to another embodiment of the present invention, $\alpha$ and $\beta$ are selected such that the sum of values ($\alpha+\beta$) is 1 and 150, preferably from 25 to 150, more preferably from 50 to 150 and most preferably from 50 to 125.

In general, the average molecular weight $M_W$ of the at least one anionically charged comb polymer may vary in broad range and is typically in a range between 10000 and 10000000 g/mol, preferably between 20000 and 7500000 g/mol and most preferably between 30000 and 5000000 g/mol.

In general, the average molecular weight $M_W$ of the at least one anionically charged comb polymer may vary in broad range and is typically in a range between 10000 and 10000000 g/mol, preferably between 15000 and 7500000 g/mol, more preferably between 20000 and 5000000 g/mol, even more preferably between 25000 and 1000000 g/mol, and most preferably between 30000 and 150000 g/mol.

Furthermore, the carbonic acid groups and/or other acid groups of the at least one anionically charged comb polymer are preferably present in the form of free acids or salts thereof. In one preferred embodiment of the present invention, at least 25 wt.-%, based on the total amount of acid groups, of the carbonic acid groups and/or other acid groups of the at least one anionically charged comb polymer are in the form of a salt, more preferably at least 35 wt.-% and most preferably at least 45 wt.-%. For example, between 45 and 55 wt.-%, based on the total amount of acid groups, or about 100 wt.-% of the carbonic acid groups and/or other acid groups of the at least one anionically charged comb polymer are in the form of a salt. It is preferred that the carbonic acid groups and/or other acid groups of the at least one anionically charged comb polymer are neutralized with sodium.

In one preferred embodiment of the present invention, the at least one anionically charged comb polymer is added to the aqueous calcium carbonate containing composition such that the composition comprises the at least one anionically charged comb polymer in an amount from 0.01 to 10 wt.-%, based on the total dry weight of the composition. It is preferred that the aqueous calcium carbonate containing composition comprises the at least one anionically charged comb polymer in an amount from 0.05 to 5 wt.-%, more preferably from 0.1 to 3 wt.-% and even more preferably from 0.15 to 2.5 wt.-%, based on the total dry weight of the composition. For example, the aqueous calcium carbonate containing composition comprises the at least one anionically charged comb polymer in an amount from 0.2 to 2 wt.-% or from 0.15 to 1.75 wt.-%, based on the total dry weight of the composition.

Optionally, the aqueous calcium carbonate containing composition comprises at least one binding agent in an amount of at least 2.5 wt.-%, based on the total dry weight of the composition.

The expression "at least one" binding agent means that one or more binding agents may be present in the aqueous calcium carbonate containing composition.

According to one preferred embodiment of the present invention, only one binding is present in the aqueous composition comprising the calcium carbonate containing material. According to another embodiment of the present invention, a mixture of at least two binding agents is present in the aqueous composition comprising the calcium carbonate containing material.

In one preferred embodiment of the present invention, the at least one binding agent is selected from the group comprising polyvinyl alcohol, polyvinyl acetate, starch, proteins such as casein, cellulose and cellulosic derivatives such as ethylhydroxylethyl cellulose and/or carboxymethyl cellulose, and mixtures thereof. It is preferred that the at least one binding agent is selected from polyvinyl alcohol and polyvinyl acetate.

If the at least one binding agent comprises a mixture of at least two binding agents, one binding agent is preferably polyvinyl alcohol or polyvinyl acetate and a further binding agent is starch.

With regard to the amount of the at least one binding agent in the aqueous calcium carbonate containing composition it should be noted that the amount may vary in a broad range as long as a sufficient binding capacity is achieved. However, it is preferred that the aqueous calcium carbonate containing composition comprises the at least one binding agent in an amount between 2.5 and 20 wt.-%, based on the total dry weight of the composition, and preferably between 5 and 17 wt.-%. For example, the aqueous calcium carbonate containing composition comprises the at least one binding agent in an amount between 12 and 16 wt.-%, based on the total dry weight of the composition.

One specific requirement of the present invention is that the aqueous calcium carbonate containing composition comprises at least one salt of a divalent or trivalent cation in an amount between 1 and 20 wt.-%, based on the total dry weight of the composition.

The expression "at least one" salt of a divalent or trivalent cation means that one or more salts of a divalent or trivalent cation may be present in the aqueous calcium carbonate containing composition.

According to one preferred embodiment of the present invention, only one salt of a divalent or trivalent cation is present in the aqueous slurry comprising the calcium carbonate containing material. According to another embodiment of the present invention, a mixture of at least two salts of a divalent or trivalent cation is present in the aqueous slurry comprising the calcium carbonate containing material.

The term "salt of a divalent cation" in the meaning of the present invention refers to a cation having a valency of two, e.g. a metal cation having two valencies.

The term "salt of a trivalent cation" in the meaning of the present invention refers to a cation having a valency of three, e.g. a metal cation having three valencies.

For example, the at least one salt of a divalent or trivalent cation is selected from a chloride salt of a divalent or trivalent cation, a bromide salt of a divalent or trivalent cation, a sulfate salt of a divalent or trivalent cation and mixtures thereof.

In one preferred embodiment of the present invention, the at least one salt of a divalent or trivalent cation is a chloride salt of a divalent or trivalent cation. It is preferred that the at least one salt of a divalent or trivalent cation is a chloride salt of a divalent or trivalent cation selected from the group comprising calcium chloride, magnesium chloride, strontium chloride, zinc chloride, manganese chloride and mixtures thereof. It is preferred that the at least one salt of a divalent or trivalent cation is calcium chloride.

In one preferred embodiment of the present invention, the at least one salt of a divalent or trivalent cation is added to the aqueous calcium carbonate containing composition such that the composition comprises the at least one salt of a divalent or trivalent cation in an amount between 1 and 20 wt.-%, based on the total dry weight of the composition, whereby at least 95 wt.-% of the total amount of salt is dissolved within the composition.

The term "dissolved" in the meaning of the present invention refers to systems in which no discrete solid particles of the at least one salt of a divalent or trivalent cation are observed in the solvent. The amount of dissolved salt of a divalent or trivalent cation within the composition can be determined by the following method:

1. Taking a first sample of the composition, filtering the sample to extract at least some of the aqueous phase, and measuring in a well-known way, e.g. by ion-chromatography, the ion content of the salt of the divalent or trivalent cations of the aqueous phase;
2. Taking a second sample of the same composition, diluting the second sample by a factor of two, based on the weight of the water in the composition, with deionized water, filtering the sample to extract at least some of the aqueous phase, then measuring the ion content of the salt of the divalent or trivalent cations by the same method as above for the first sample, multiply this result by a factor of two, and compare this result with the result of the first sample.

When the result of the first sample is within 95% of the result of the second sample, this means that all salt is dissolved according to the definition of the present application.

It is preferred that the aqueous calcium carbonate-containing composition comprises the at least one salt of a divalent or trivalent cation in an amount between 3 and 17 wt.-%, based on the total dry weight of the composition, more preferably between 5 and 15 wt.-% and even more preferably between 6 and 13 wt.-%, based on the total dry weight of the composition, whereby at least 95 wt.-% of the total amount of salt is dissolved within the composition. For example, the aqueous calcium carbonate-containing composition comprises the at least one salt of a divalent or trivalent cation in an amount from 7 and 12 wt.-%, based on the total dry weight of the composition whereby at least 95 wt.-% of the total amount of salt is dissolved within the composition.

Optionally, the aqueous calcium carbonate-containing composition comprises further additives.

In one preferred embodiment of the present invention, the aqueous calcium carbonate containing composition comprises cationic homopolymers based on monomer units, such as diallyl dialkyl ammonium salts or polyethylene imines.

In one preferred embodiment of the present invention, the aqueous calcium carbonate containing composition comprises an additional dispersing agent, e.g. a polyacrylate. In another preferred embodiment of the present invention, the aqueous calcium carbonate containing composition is free of additional dispersing agents, e.g. polyacrylate.

The aqueous calcium carbonate containing composition may have solids content from 10 to 70 wt.-%, preferably from 20 to 65 wt.-%, more preferably from 25 to 60 wt.-%, based on the total dry weight of the composition.

The aqueous calcium carbonate containing composition may have a pH from >6.5 to 11, preferably from 7.5 and 10.7, and more preferably from 8.5 to 10.3.

The inventive aqueous calcium carbonate containing composition especially features an advantageous Brookfield viscosity compared to compositions described in the prior art.

It is thus required that the Brookfield viscosity of the aqueous calcium carbonate containing composition is below 2.500 mPa·s at 25° C. In one preferred embodiment of the present invention, the aqueous calcium carbonate containing composition has a Brookfield viscosity from 50 to 2500 mPa·s at 25° C., preferably from 25 to 2000 mPa·s at 25° C., more preferably from 25 to 1500 mPa·s at 25° C. and most preferably from 150 to 2000 mPa·s at 25° C.

According to the present invention the Brookfield viscosity is measured after 1 minute of stirring by the use of an RVT model Brookfield™ viscometer at a temperature of about 25° C., and a rotation speed of 100 rpm (revolutions per minute) with the appropriate disc spindle N° 1 to 5.

Preferably, the aqueous calcium carbonate containing composition is in form of a suspension.

A "suspension" or "slurry" in the meaning of the present invention comprises insoluble solids and water, and optionally further additives and usually contains large amounts of solids, and, thus, is more viscous and can be of higher density than the liquid from which it is formed.

According to a preferred embodiment of the present invention, the aqueous calcium carbonate containing composition does not contain an additive having a specific charge of more than −700 C/g at pH 8, e.g. of more than −500 C/g at pH 8.

A further advantage of the inventive aqueous calcium carbonate containing composition resides in the fact that optical properties such as optical density and mottle of a paper product treated with the inventive composition are maintained.

In view of the advantageous properties of the aqueous calcium carbonate containing composition, especially the exceptional mechanical properties expressed by a Brookfield viscosity of below 2500 mPa·s at 25° C., the inventive aqueous calcium carbonate containing composition is suitable in a broad variety of applications.

In view of the very good results regarding the mechanical and optical properties of the aqueous calcium carbonate as defined above, a further aspect of the present invention is the use of said composition in paper, plastic, paint, and/or agriculture applications. In one preferred embodiment of the present invention, the aqueous calcium carbonate containing composition is used as a support for inkjet digital printing, flexo, rotogravure and/or offset, preferably for inkjet digital printing.

According to a further aspect of the present invention, the aqueous calcium carbonate containing composition can be used as filler in paper.

According to another aspect of the present invention, a method for producing an aqueous calcium carbonate containing composition is provided, comprising the steps of
a) providing water,
b) providing a calcium carbonate containing material,
c) providing at least one anionically charged comb polymer having a specific charge of −5 to −500 C/g at pH 8,
d) optionally providing at least one binding agent in an amount of at least 2.5 wt.-%, based on the total dry weight of the composition,
e) providing at least one salt of a divalent or trivalent cation in an amount of between 1 and 20 wt.-%, based on the total dry weight of the composition, whereby at least 95 wt.-% of the total amount of salt is dissolved within the composition
f) contacting the calcium carbonate containing material of step b) with the water of step a),
g) contacting the calcium carbonate containing material of step b) with the at least one anionically charged comb polymer of step c) before and/or during and/or after step f),
h) optionally contacting the calcium carbonate containing material of step b) with the at least one binding agent of step d) before and/or during and/or after step f) and/or before and/or during and/or after step g), and
i) contacting the calcium carbonate containing material of step b) with the at least one salt of a divalent or trivalent cation of step e) before or after step g), preferably after step g).

The contacting of the calcium carbonate containing material of step b) with the water of step a) according to method step f) and/or the contacting of the calcium carbonate containing material of step b) with the at least one anionically charged comb polymer of step c) according to method step g) and/or the contacting of the calcium carbonate containing material of step b) with the at least one binding agent of step d) according to method step h) and/or the contacting of the calcium carbonate containing material of step b) with the at least one salt of a divalent or trivalent cation of step e) according to method step i) can be accomplished by any conventional means known to the skilled person. Preferably, the contacting may be carried out under mixing and/or homogenizing and/or particle dividing conditions. The skilled person will adapt these mixing and/or homogenizing and/or particle dividing conditions such as the mixing speed, dividing, and temperature according to his process equipment.

For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany.

According to one embodiment of the present invention, method step f) and/or method step g) and/or method step h) and/or method step i) is/are carried out by using a ploughshare mixer.

According to an exemplary embodiment the calcium carbonate-containing material of step b) contains a ground calcium carbonate which is obtained by wet grinding a calcium carbonate containing material and method step f) and/or method step g) and/or method step h) and/or method step i) is carried out before and/or during and/or after wet grinding the calcium carbonate containing material. In one preferred embodiment of the present invention, method step f) and/or method step g) and/or method step h) and/or method step i) is/are carried out after wet grinding the calcium carbonate containing material.

Preferably, the wet grinding of the calcium carbonate containing material is performed in presence of a dispersant or grinding aid agent in the suspension.

A variant of the method according to the invention is characterized in that the wet grinding of the calcium carbonate containing material is performed in absence of any dispersant or any grinding aid agent in the suspension.

This process is also characterized in that if a dispersant (other than the at least one anionically charged comb polymer) is present it is present in a weight % relative to the total dry calcium carbonate containing material ranging from 0.001 wt.-% to 5 wt.-%, preferably from 0.001 wt.-% to 2 wt.-%, and most preferably from 0.05 wt.-% to 1 wt.-% for example 0.50 wt.-%, and may be added before and/or during and/or after wet grinding of the calcium carbonate containing material.

Conventional dispersants known to the skilled person can be used. A preferred dispersant is a salt of polyacrylic acid.

The method step f) and/or method step g) and/or method step h) and/or method step i) may be carried out at room temperature, i.e. at 20° C., or at other temperatures.

According to one embodiment of the present invention, method step f) and/or method step g) and/or method step h) and/or method step i) is carried out for at least 1 s, preferably for at least 1 min, e.g. for at least 15 min, 30 min, 1 hour, 2 hours, 4 hours, 6 hours, 8 hours, or 10 hours.

In one preferred embodiment of the present invention, the contacting of the calcium carbonate containing material of step b) with the at least one anionically charged comb polymer of step c) according to method step g) is carried out after method step f).

In another preferred embodiment of the present invention, the contacting of the calcium carbonate containing material of step b) with the at least one binding agent of step d) according to method step h) is carried out after method step f) and/or before method step g).

In one preferred embodiment of the present invention, the contacting of the calcium carbonate containing material of step b) with the at least one salt of a divalent or trivalent cation of step e) according to method step h) is carried out after method step g).

According to one embodiment of the present invention, the calcium carbonate containing material of step b) is contacted with further additives known to the skilled person. For example, the calcium carbonate containing material of step b) is further contacted with at least one fixation aid like cationic homopolymers based on monomer units of diallyl dialkyl ammonium salts or polyethylene imines.

Preferably, the contacting of the calcium carbonate containing material of step b) with the at least one further additive is carried out before and/or during and/or after step f) and/or before and/or during and/or after step g) and/or before and/or during and/or after step h) and/or before and/or during and/or after step i). Preferably, the contacting of the calcium carbonate containing material of step b) with the at least one further additive is carried out before step i).

The obtained aqueous calcium carbonate containing composition has a Brookfield viscosity of below 2500 mPa·s at 25° C. Preferably, the Brookfield viscosity of the aqueous calcium carbonate containing composition is from 50 to 2500 mPa·s at 25° C., preferably from 25 to 2000 mPa·s at 25° C., more preferably from 25 to 1500 mPa·s at 25° C. and most preferably from 150 to 2000 mPa·s at 25° C.

Additionally or alternatively, the obtained aqueous calcium carbonate containing composition has solids content from 10 to 70 wt.-%, preferably from 20 to 65 wt.-%, more preferably from 25 to 60 wt.-%, based on the total dry weight of the composition.

The aqueous calcium carbonate containing composition obtained according to the inventive method described above may be dried with any suitable method known in the art. The c aqueous calcium carbonate containing composition may be dried, for example, thermally, e.g. by means of a spray drier or a microwave or in an oven, or mechanically, e.g. by filtration, or lowering the water content.

According to another aspect of the present invention, a method for producing an aqueous calcium carbonate containing composition is provided, comprising the steps of
a) providing water,
b) providing a calcium carbonate containing material,
c) providing at least one anionically charged comb polymer having a specific charge of −5 to −500 C/g at pH 8,
d) optionally providing at least one binding agent in an amount of at least 2.5 wt.-%, based on the total dry weight of the composition,
e) providing at least one salt of divalent or trivalent cation in an amount of between 1 and 20 wt.-%, based on the total dry weight of the composition whereby at least 95 wt.-% of the total amount of salt is dissolved within the composition,
f) combining the water of step a), the calcium carbonate containing material of step b) and the at least one anionically charged comb polymer of step c) in any order to form a suspension,
g) dispersing and/or grinding the suspension obtained in step f),
h) optionally contacting the calcium carbonate suspension obtained in step g) with the at least one binding agent of step d),
i) contacting the calcium carbonate suspension obtained in step g) with the at least one salt of a divalent or trivalent cation of step e) after step g) or contacting the calcium carbonate suspension of step h) with the at least one salt of a divalent or trivalent cation of step e) after step h).

The combining of the water of step a), the calcium carbonate containing material of step b) and the at least one anionically charged comb polymer of step c) according to method step f) can be accomplished by any conventional means known to the skilled person. Preferably, the combining may be carried out under mixing and/or homogenizing and/or particle dividing conditions. The skilled person will adapt these mixing and/or homogenizing and/or particle dividing conditions such as the mixing speed, dividing, and temperature according to his process equipment.

For example, the mixing and homogenizing may take place by means of a ploughshare mixer as e.g. already described above.

According to an exemplary embodiment of the present invention, the calcium carbonate containing material of step b) contains a ground calcium carbonate which is obtained by wet grinding a calcium carbonate containing material and method step f) is carried out before and/or during and/or after wet grinding the calcium carbonate containing material. Preferably, method step f) is carried out before after wet grinding the calcium carbonate containing material.

Preferably, the wet grinding of the calcium carbonate containing material is performed in presence of a dispersant or grinding aid agent in the suspension.

A variant of the method according to the invention is characterized in that the wet grinding of the calcium carbonate containing material is performed in absence of any dispersant or any grinding aid agent in the suspension.

This process is also characterized in that if a dispersant is present, it is present in a weight % relative to the total dry calcium carbonate containing material ranging from 0.001 wt.-% to 5 wt.-%, preferably from 0.001 wt.-% to 2 wt.-%, and most preferably from 0.05 wt.-% to 1 wt.-% for example 0.50 wt.-%, and may be added before and/or during and/or after wet grinding of the calcium carbonate containing material.

Conventional dispersants known to the skilled person can be used. A preferred dispersant is a salt of polyacrylic acid.

In accordance with the inventive method for producing the aqueous calcium carbonate containing composition, the suspension formed in step f) by combining of the water of step a), the calcium carbonate containing material of step b) and the at least one anionically charged comb polymer of step c) is dispersed and/or ground according to method step g).

Preferably, method step g) is carried out in a milling device, preferably in a ball mill, preferably in combination with a cyclone device that re-circulates agglomerates and/or aggregates formed during method step g) back to the inlet of the milling device. A cyclone device enables the separation of particulate material such as particles, agglomerates or aggregates, into fractions of smaller and larger particulate material based on gravity.

According to an embodiment of the present invention the particulate material contained in the aqueous calcium carbonate containing composition is divided into smaller particles according to method step g). The term "dividing" as used in the present invention means that particles are split into smaller particles. This may be done by grinding, e.g. using a ball mill, a hammer mill, a rod mill, a vibrating mill, a roll crusher, a centrifugal impact mill, a vertical bead mill, an attrition mill, a pin mill, a hammer mill, a pulveriser, a shredder, a de-clumper, or a knife cutter. However, any other device that is able to divide the particulate material contained in the aqueous calcium carbonate containing composition into smaller particles may be used.

The contacting of the calcium carbonate suspension of step g) with the at least one binding agent of step d) according to optional method step h) and/or the contacting of the calcium carbonate suspension of step h) with the at least one salt of a divalent or trivalent cation of step e) according to method step i) can be accomplished by any conventional means known to the skilled person. Preferably, the contacting may be carried out under mixing and/or homogenizing and/or particle dividing conditions. The skilled person will adapt these mixing and/or homogenizing and/or particle dividing conditions such as the mixing speed, dividing, and temperature according to his process equipment.

For example, the mixing and homogenizing may take place by means of a ploughshare mixer as e.g. already described above.

According to one embodiment of the present invention, method step f) and/or method step h) and/or method step i) is/are carried out by using a ploughshare mixer.

The method step f) and/or method step g) and/or optional method step h) and/or method step i) may be carried out at room temperature, i.e. at 20° C., or at other temperatures.

According to one embodiment of the present invention, method step f) and/or method step g) and/or optional method step h) and/or method step i) is carried out for at least 1 s, preferably for at least 1 min, e.g. for at least 15 min, 30 min, 1 hour, 2 hours, 4 hours, 6 hours, 8 hours, or 10 hours.

If optional method step h) is carried out, it is a requirement of the present invention that the contacting of the calcium carbonate suspension obtained in step g) with the at least one binding agent of step d) according to method step h) is carried out before the contacting of the suspension with the at least one salt of a divalent or trivalent cation of step e) according to method step i). Accordingly, method step i) is carried out after method step h).

In case optional method step h) is not carried out, the calcium carbonate suspension obtained in step g) is contacted with the at least one salt of a divalent or trivalent cation of step e) after step g).

According to one embodiment of the present invention, the calcium carbonate containing material of step b) is contacted with further additives known to the skilled person. For example, the calcium carbonate containing material of step b) is further contacted with at least one fixation aid like cationic homopolymers based on monomer units of diallyl dialkyl ammonium salts or polyethylene imines.

Preferably, the contacting of the calcium carbonate containing material of step b) with the at least one further additive is carried out before and/or during and/or after step f) and/or before and/or during and/or after step g) and/or before and/or during and/or after step h) and/or before and/or during and/or after step i). Preferably, the contacting of the calcium carbonate containing material of step b) with the at least one further additive is carried out before step i).

The obtained aqueous calcium carbonate containing composition has a Brookfield viscosity of below 2500 mPa·s at 25° C. Preferably, the Brookfield viscosity of the aqueous calcium carbonate containing composition is from 50 to 2500 mPa·s at 25° C., preferably from 25 to 2000 mPa·s at 25° C., more preferably from 25 to 1500 mPa·s at 25° C. and most preferably from 150 to 2000 mPa·s at 25° C.

Additionally or alternatively, the obtained aqueous calcium carbonate containing composition has solids content from 10 to 70 wt.-%, preferably from 20 to 65 wt.-%, more preferably from 25 to 60 wt.-%, based on the total dry weight of the composition.

The aqueous calcium carbonate containing composition obtained according to the inventive method described above may be dried with any suitable method known in the art. The c aqueous calcium carbonate containing composition may be dried, for example, thermally, e.g. by means of a spray drier or a microwave or in an oven, or mechanically, e.g. by filtration, or lowering the water content.

According to a variant of the afore mentioned methods, a method for producing an aqueous calcium carbonate containing composition is provided, comprising the steps of
  a) providing water,
  b) providing a calcium carbonate containing material,
  c) providing at least one anionically charged comb polymer having a specific charge of −5 to −500 C/g at pH 8,
  d) providing at least one salt of a divalent or trivalent cation in an amount between 10 to 50 wt.-%, based on the total dry weight of the at least one anionically charged comb polymer of step c),
  e) optionally providing at least one binding agent in an amount of at least 2.5 wt.-%, based on the total dry weight of the composition,
  f) combining the at least one anionically charged comb polymer of step c) and the at least one salt of a divalent or trivalent cation of step d),
  g) contacting the calcium carbonate containing material of step b) with the water of step a),
  h) contacting the calcium carbonate containing material of step b) with the at least one anionically charged comb polymer of step f) before and/or during and/or after step g),
  i) optionally contacting the calcium carbonate containing material of step b) with the at least one binding agent of step e) before and/or during and/or after step g) and/or before and/or during and/or after step h).

According to another variant of the afore mentioned methods, a method for producing an aqueous calcium carbonate containing composition is provided, comprising the steps of
  a) providing water,
  b) providing a calcium carbonate containing material,
  c) providing at least one anionically charged comb polymer having a specific charge of −5 to −500 C/g at pH 8,
  d) providing at least one salt of a divalent or trivalent cation in an amount between 10 to 50 wt.-%, based on the total dry weight of the at least one anionically charged comb polymer of step c),
  e) optionally providing at least one binding agent in an amount of at least 2.5 wt.-%, based on the total dry weight of the composition,
  f) combining the at least one anionically charged comb polymer of step c) and the at least one salt of a divalent or trivalent cation of step d),
  g) combining the water of step a), the calcium carbonate containing material of step b) and the at least one anionically charged comb polymer of step f) in any order to form a suspension,
  h) dispersing and/or grinding the suspension obtained in step g),
  i) optionally contacting the calcium carbonate suspension of step h) with the at least one binding agent of step e).

The scope and interest of the invention will be better understood based on the following examples which are intended to illustrate certain embodiments of the invention and are non-limitative.

EXAMPLES

1. Measurement Methods pH Measurement

Figure 1:
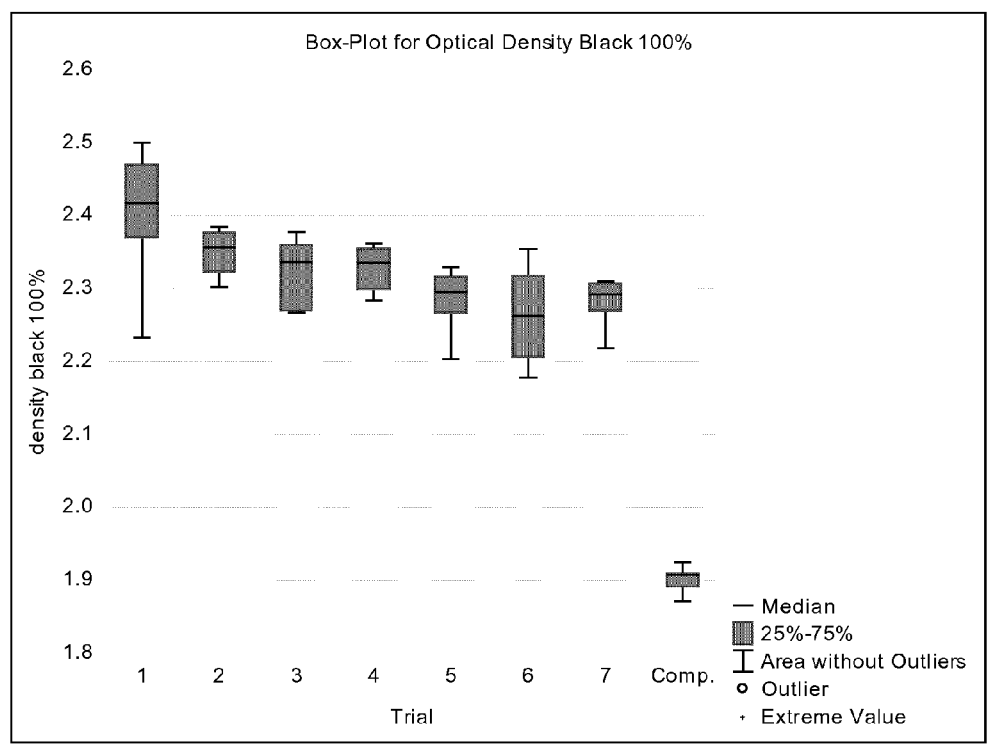
FIG. 1 outlines the optical density of black of a coated paper product prepared from the inventive aqueous calcium carbonate containing composition.

The pH is measured at 25° C. using a Mettler Toledo Seven Easy pH meter and a Mettler Toledo InLab® Expert Pro pH electrode. A three point calibration (according to the segment method) of the instrument is first made using commercially available buffer solutions having pH values of 4, 7 and 10 at 20° C. (from Aldrich). The reported pH values are the endpoint values detected by the instrument (the endpoint is when the measured signal differs by less than 0.1 mV from the average over the last 6 seconds).

Brookfield Viscosity

The Brookfield viscosity was measured after 1 minute of stirring by the use of a RVT model Brookfield™ viscometer at a temperature of 25° C., and a rotation speed of 100 rpm (revolutions per minute) with the appropriate disc spindle from N° 1 to 5.

Particle Size Distribution (Mass % Particles with a Diameter<X) and Weight Median Grain Diameter ($d_{50}$) of Particulate Material Weight median grain diameter and grain diameter mass distribution of a particulate material were determined via the sedimentation method, i.e. an analysis of sedimentation behaviour in a gravimetric field. The measurement was made with a Sedigraph™ 5120.

The method and the instrument are known to the skilled person and are commonly used to determine grain size of fillers and pigments. The measurement is carried out in an aqueous solution of 0.1% by weight of $Na_4P_2O_7$. The samples were dispersed using a high speed stirrer and ultrasonic.

Weight Solids (Wt. %) of a Material in Suspension

The weight solids were determined by dividing the weight of the solid material by the total weight of the aqueous suspension. The weight solids content was determined at 160° C. using a Moisture Analyser MJ 33, Mettler Toledo.

Specific Surface (BET) Measurement

The specific surface area (in $m^2/g$) of the mineral filler was determined using the BET method, which is well known to the skilled man (ISO 9277:1995). The total surface area (in $m^2$) of the mineral filler was then obtained by multiplication of the specific surface area and the mass (in g) of the mineral filler. The method and the instrument are known to the skilled person and are commonly used to determine specific surface of fillers and pigments.

Specific Charge (C/g)

The cationic polymer demand that is necessary to achieve a charge value of zero was measured using the Mettler DL 77 titrator and the Mütec PCD-02 detector by means of the cationic titration method. The cationic reagent was N/200 (0.005 N) methyl glycol chitosan (chitosan), and the anionic reagent was N/400 (0.0025 N) K-polyvinyl-sulfate (KPVS), both sold by WAKO Chemicals GmbH.

If necessary, the sample was adjusted to pH 8.0+/−0.1 with NaOH (0.1M) prior to measurement.

Since experience showed that the first titration is not correct, 10 ml water were first prepared in the detector followed by the addition of 0.5 ml KPVS. Afterwards, titration with chitosan was made until it is back to shortly after the equivalence point. Subsequently, the measurements were started. Between 0.5 and 2.0 ml of 0.005 molar reagent were used up during the titration to obtain reproducible values.

To avoid rapid sedimentation, the sample was drawn under stirring, by means of a tared syringe. The content of the syringe was then rinsed into the sample vessel by means of distilled water. Afterwards, the detector was filled with distilled water up to the lower edge and the piston was inserted carefully. Subsequently, the cationic titration solution was put on the memotitrator and the top of the burette was fixed at the detector ensuring that it does not come into contact with the detector or the liquid. After each titration, the development of the titration was verified with the aid of the titration curve.

Calculation of the Electrochemical Charge:

$$\text{Charge}[\mu Val/g] = \frac{V \cdot c \cdot z \cdot t}{E \cdot F} \cdot K$$

wherein
K=+1000
V: Consumption chitosan [ml]
c: Concentration chitosan [mol/l]
t: Titer factor chitosan
E: Weight-in quantity [g]
F: Mass fraction solids [g/g]
z: Valence (equivalence number)

The obtained charge value of μVal/g was converted into C/g by multiplication with the Faraday constant as follows:

$$[C/g]=[\mu Val/g] \cdot 0.096485$$

Intrinsic Viscosity

The intrinsic viscosity was determined by a Schott AVS 350 system. The samples were dissolved in an aqueous 6 wt.-% NaCl solution, adjusted to pH 10 using NaOH. Measurements were performed at 25° C. with a capillary type 0a and corrected using the Hagenbach correction.

Average Molecular Weight ($M_W$)

The average molecular weight was determined by size exclusion chromatography (SEC) also referred to as "gel permeation chromatography" (GPC). A device for liquid chromatography from WATERS™ equipped with two detectors was used. The first detector combined static dynamic light scattering at an angle of 90° and viscosity measurement with a VISCOTEK™ MALVERN™ viscometer and the second detector was a refractometric concentration detector from WATERS™. The liquid chromatography apparatus was equipped with an isocratic pump (WATER 515), an oven and size exclusion columns. The columns were a GUARD COLUMN ULTRAHYDROGEL WATERS™ pre-column with a length of 6 cm and an internal diameter of 40 mm, a ULTRAHYDROGEL WATERS™ column with a length of 30 cm and an internal diameter 7.8 mm, and a ULTRAHYDROGEL 120 ANGSTROM WATERS™ column with a length of 30 cm and an internal diameter 7.8 mm. The detecting system consisted of a RI WATERS™ 410 refractometric detector and of a dual 270 DUAL DETECTOR MALVERN™ detector for viscometry and light scattering at an angle of 90°.

The oven was heated to 55° C. and the refractometer was heated to 45° C. The flow of the isocratic pump was set to 0.8 mL/min and the liquid eluent was an aqueous phase containing 1% KNO3.

The chromatography apparatus was calibrated by a PEO 19k PolyCAL™ MALVERN™ single standard.

The average molecular weight was measured by diluting the polymerization solution to 0.9% by dry-weight with the SEC eluent (1% $KNO_3$ solution), and afterwards filtering the solution through 0.2 μm. 100 μL of the filtered solution were injected into the chromatography apparatus.

Mottling

The mottling was determined using a PaPEye software solution with internal test procedure developed by Omya AG.

Optical Density

The optical density is a dimension for the thickness of the colour layer above the substrate. Optical density values are calculated based on the spectral measurement, therefore slight differences to the measurement with a densitometer may occur. The calculation is made according to the DIN Norm 16536-2.

Surface Strength and Rub Resistance

Surface strength and rub resistance against black paper was determined using a Quartant-rub tester according to the following method: the coated paper is applied against a black tinted "Folia" drawing paper from Max Bringmann KG (Germany) under a weight of 600 g and the coated paper is rotated against the black paper.

2. Examples

Example 1

This example refers to the addition of different anionically charged comb polymers to a commercially available calcium carbonate which is dispersed by a sodium polyacrylate allowing to achieve the compatibility with a salt of a divalent or trivalent cation.

This is achieved by mixing water with the commercially available calcium carbonate suspension Omyajet® 5020 from Omya such that the obtained suspension has a content of calcium carbonate of about 50 wt.-%, based on the total weight of the suspension.

The commercial product Omyajet® 5020 refers to an aqueous suspension comprising calcium carbonate which is anionically dispersed.

Test 1

This test corresponds to a reference.

To 100 parts per weight of calcium carbonate (d/d), based on the total dry weight of calcium carbonate in the suspension, 10 parts per weight of calcium chloride (d/d), based on the total dry weight of calcium carbonate in the suspension, are directly added by moderate agitation.

The obtained slurry shows a severe increase in Brookfield viscosity to a value of about 7000 mPa·s at 25° C. and 100 rpm.

A suspension having such viscosity is not suitable for all further handling steps or storage of the suspension.

For the following tests 2 to 12, an anionically charged comb polymer is first added to the calcium carbonate suspension followed by 10 parts per weight of calcium chloride (d/d), based on the total dry weight of calcium carbonate in the suspension. For each test, 3 test samples were prepared corresponding to 3 different dosages of the anionically charged comb polymer, i.e. the anionically charged comb polymer was added in an amount of 0.8 wt.-%, 1 wt.-% and 1.5 wt.-%, based on the total dry weight of calcium carbonate, respectively.

Test 2

This test represents the prior art.

A polymeric additive was used representing a homopolymer of acrylic acid totally neutralised with sodium ions and having an average molecular weight $M_W$ of about 6500 g/mol.

The specific charge of this homopolymer of acrylic acid is −931 C/g measured at pH 8.

Due to the development of an agglomerated material in the suspension, the measurement of the Brookfield viscosity was impossible for the obtained suspension.

Test 3

This test represents the prior art.

A polymeric additive was used representing a homopolymer of acrylic acid of which 100% of the carboxylic acid groups are neutralised with sodium ions and having an average molecular weight $M_W$ of about 6500 g/mol.

The specific charge of this homopolymer of acrylic acid is −931 C/g measured at pH 8.

The measurement of the Brookfield viscosity was impossible for the obtained suspension.

Test 4

This test represents the invention.

The anionically charged comb polymer is a copolymer comprising
  a) 12.8 wt.-%, based on the total amount of monomers, of acrylic acid,
  b) 87.2 wt.-%, based on the total amount of monomers, of a monomer of Formula (II) in which R is a methacrylate functional group, R' is hydrogen, β=48, α=16.

The average molecular weight $M_W$ is about 45000 g/mol and about 100% of the carboxylic acid groups are neutralised with sodium ions.

The specific charge of the anionically charged comb polymer is −500 C/g measured at pH 8.

Test 5

This test represents the invention.

The anionically charged comb polymer is a copolymer comprising
  a) 12.8 wt.-%, based on the total amount of monomers, of acrylic acid,
  b) 87.2 wt.-%, based on the total amount of monomers, of a monomer of Formula (II) in which R is a methacrylate functional group, R' is hydrogen, β=48, α=16.

The average molecular weight $M_W$ is about 130000 g/mol and about 100% of the carboxylic acid groups are neutralised with sodium ions.

The specific charge of the anionically charged comb polymer is −500 C/g measured at pH 8.

Test 6

This test represents the invention.

The anionically charged comb polymer is a copolymer comprising
  a) 7.4 wt.-%, based on the total amount of monomers, of acrylic acid,
  b) 92.6 wt.-%, based on the total amount of monomers, of a monomer of Formula (II) in which R is a methacrylate functional group, R' is hydrogen, β=48, α=16.

The average molecular weight $M_W$ is about 130000 g/mol and about 100% of the carboxylic acid groups are neutralised with sodium ions.

The specific charge of the anionically charged comb polymer is −500 C/g measured at pH 8.

Test 7

This test represents the invention.

The anionically charged comb polymer is a copolymer comprising
  a) 2.9 wt.-%, based on the total amount of monomers, of acrylic acid, 19.8 wt.-%, based on the total amount of monomers, of methacrylic acid
  b) 77.3 wt.-%, based on the total amount of monomers, of a monomer of Formula (II) in which R is a methacrylate functional group, R' is hydrogen, β=48, α=16.

The average molecular weight $M_W$ is about 39000 g/mol and about 100% of the carboxylic acid groups are neutralised with sodium ions.

The specific charge of the anionically charged comb polymer is −500 C/g measured at pH 8.

Test 8

This test represents the invention.

The anionically charged comb polymer is a copolymer comprising
- a) 12.5 wt.-%, based on the total amount of monomers, of methacrylic acid
- b) 87.5 wt.-%, based on the total amount of monomers, of a monomer of Formula (II) in which R is a methacrylate functional group, R' is hydrogen, β=48, α=16.

The average molecular weight $M_W$ is about 74000 g/mol and about 100% of the carboxylic acid groups are neutralised with sodium ions.

The specific charge of the anionically charged comb polymer is −117 C/g measured at pH 6.9 and −125 C/g measured at pH 8.

Test 9

This test represents the invention.

The anionically charged comb polymer is a copolymer comprising
- a) 6 wt.-%, based on the total amount of monomers, of acrylic acid, 1.8 wt.-%, based on the total amount of monomers, of methacrylic acid
- b) 92.2 wt.-%, based on the total amount of monomers, of a monomer of Formula (II) in which R is a methacrylate functional group, R' is a methyl group, β=0, α=113.

The average molecular weight $M_W$ is about 32500 g/mol and about 100% of the carboxylic acid groups are neutralised with sodium ions.

The specific charge of the anionically charged comb polymer is −500 C/g measured at pH 8.

Test 10

This test represents the invention.

The anionically charged comb polymer is a copolymer comprising
- a) 6 wt.-%, based on the total amount of monomers, of acrylic acid, 1.8 wt.-%, based on the total amount of monomers, of methacrylic acid
- b) 92.2 wt.-%, based on the total amount of monomers, of a monomer of Formula (II) in which R is a methacrylate functional group, R' is a methyl group, β=0, α=113.

The average molecular weight $M_W$ is about 5000000 g/mol and about 100% of the carboxylic acid groups are neutralised with sodium ions.

The specific charge of the anionically charged comb polymer is −500 C/g measured at pH 8.

Test 11

This test represents the invention.

The anionically charged comb polymer is a copolymer comprising
- a) 8 wt.-%, based on the total amount of monomers, of acrylic acid, 2.5 wt.-%, based on the total amount of monomers, of methacrylic acid,
- b) 89.5 wt.-%, based on the total amount of monomers, of a monomer of Formula (II) in which R is a methacrylate functional group, R' is a methyl group, β=0, α=113.

The average molecular weight $M_W$ is about 1800000 g/mol and about 50% of the carboxylic acid groups are neutralised with sodium ions, the other ones stay acidic.

The specific charge of the anionically charged comb polymer is −500 C/g measured at pH 8.

Test 12

This test represents the invention.

The anionically charged comb polymer is a copolymer comprising
- a) 8 wt.-%, based on the total amount of monomers, of acrylic acid, 2.5 wt.-%, based on the total amount of monomers, of methacrylic acid,
- b) 89.5 wt.-%, based on the total amount of monomers, of a monomer of Formula (II) in which R is a methacrylate functional group, R' is a methyl group, β=0, α=113.

The average molecular weight $M_W$ is about 3000000 g/mol and about 100% of the carboxylic acid groups are neutralised with sodium ions, the other ones stay acidic.

The specific charge of the anionically charged comb polymer is −500 C/g measured at pH 8.

Results

For tests 4 to 12, suspensions were obtained without the development of agglomerations (differing from the reference) and the Brookfield viscosity of said suspensions was determined at 25° C. and 100 rpm; these measurements were carried out on each of the three anionically charged comb polymer dosages. The results can be gathered from Table 1.

| Test | REFerence INvention | dosage (wt.-%)* | | |
|---|---|---|---|---|
| | | 0 | 0.8 | 1 | 1.5 |
| 1 | REF | 7000 | — | — | — |
| 4 | IN | — | 1140 | 760 | 645 |
| 5 | IN | — | 1800 | 1230 | 1150 |
| 6 | IN | — | 2820 | 2880 | 1480 |
| 7 | IN | — | 1375 | 1090 | 825 |
| 8 | IN | — | 2010 | 1765 | 1980 |
| 9 | IN | — | 1220 | 810 | 650 |
| 10 | IN | — | 2290 | 1200 | 1065 |
| 11 | IN | — | 2960 | 2040 | 1370 |
| 12 | IN | — | 3290 | 2100 | 1275 |

*dosage (wt.-%): refers to the wt.-% of the anionically charged comb polymer based on the total dry weight of calcium carbonate.

From the results obtained it can be gathered that only the inventive Examples comprising the at least one anionically charged comb polymer advantageously reduces the viscosity of the suspension comprising a salt of a divalent or trivalent cation. These suspensions, which are also stable and susceptible to manipulation, allow the preparation of coating compositions for use in inkjet digital printing applications.

Example 2

This example refers to the addition of different anionically charged comb polymers to a commercially available calcium carbonate which is dispersed by a sodium polyacrylate allowing to achieve the compatibility with a salt of a divalent or trivalent cation.

This is achieved by methods well known to the skilled person, by dispersing the commercially available calcium carbonate Hydrocarb® 90 from Omya in the presence of a dispersing agent in water such that the obtained aqueous suspension has a content of calcium carbonate of about 60 wt.-% of calcium carbonate, based on the total weight of the suspension.

The dispersing agent represents a homopolymer of acrylic acid totally neutralised with sodium ions and having an average molecular weight $M_W$ of about 6500 g/mol.

Test 13

This test represents a reference.

To 100 parts per weight of calcium carbonate (d/d), based on the total dry weight of calcium carbonate in the suspension, 10 parts per weight of calcium chloride (d/d), based on the total dry weight of calcium carbonate in the suspension, are directly added by moderate agitation.

The obtained slurry shows a severe increase in Brookfield viscosity to a value of about 2230 mPa·s at 25° C. and 100 rpm.

For the following tests 14 and 15, a polymeric additive or an anionically charged comb polymer is first added to the calcium carbonate suspension followed by 10 parts per weight of calcium chloride (d/d), based on the total dry weight of calcium carbonate in the suspension.

Test 14

This test represents the prior art.

0.8 wt.-%, based on the total amount of calcium carbonate, of a polymeric additive is used representing a homopolymer of acrylic acid of which 100% of the carboxylic acid groups are neutralised with sodium ions and having an average molecular weight $M_W$ of about 6500 g/mol.

The Brookfield viscosity of the obtained suspension measured at 25° C. and 100 rpm severely increased compared to the viscosity of the reference to a value of about 4260 mPa·s. This clearly demonstrates the inefficiency of the tested polymeric additive.

Test 15

This test represents the invention.

0.8 wt.-%, based on the total amount of calcium carbonate, of an anionically charged comb polymer being a copolymer comprising
  a) 12.8 wt.-%, based on the total amount of monomers, of acrylic acid,
  b) 87.2 wt.-%, based on the total amount of monomers, of a monomer of Formula (II) in which R is a methacrylate functional group, R' is hydrogen, β=48, α=16.

The average molecular weight $M_W$ is about 45000 g/mol and about 100% of the carboxylic acid groups are neutralised with sodium ions.

The specific charge of the anionically charged comb polymer is −500 C/g measured at pH 8.

The Brookfield viscosity at 25° C. and 100 rpm of the suspension is clearly reduced in comparison to the viscosity measured for the reference to a value of about 450 mPa·s. This clearly demonstrates the compatibility of the tested anionically charged comb polymer with an aqueous suspension comprising an anionically dispersed calcium carbonate by adding a salt of a divalent or trivalent cation.

This inventive suspension may advantageously be directly used as coating composition for use in inkjet digital printing applications.

Example 3

This example demonstrates the development of the printing quality, e.g. optical density and mottle, of the aqueous calcium carbonate containing composition used as coating colour formulation by adding a divalent or trivalent salt.

1. Materials

Comb Polymer A (Inventive):

The anionically charged comb polymer is a copolymer comprising
  a) 12.5 wt.-%, based on the total amount of monomers, of methacrylic acid
  b) 87.5 wt.-%, based on the total amount of monomers, of a monomer of Formula (II) in which R is a methacrylate functional group, R' is hydrogen, β=48, α=16.

The average molecular weight $M_W$ is about 74000 g/mol and about 100% of the carboxylic acid groups are neutralised with sodium ions.

The specific charge of the anionically charged comb polymer is −117 C/g measured at pH 6.9 and −125 C/g measured at pH 8.

The intrinsic viscosity is 24 mL/g.

Comb Polymer B (Inventive):

The anionically charged comb polymer is a copolymer comprising
  a) 2.9 wt.-%, based on the total amount of monomers, of acrylic acid, 19.8 wt.-%, based on the total amount of monomers, of methacrylic acid
  b) 77.3 wt.-%, based on the total amount of monomers, of a monomer of Formula (II) in which R is a methacrylate functional group, R' is hydrogen, β=48, α=16.

The average molecular weight $M_W$ is about 39000 g/mol and about 100% of the carboxylic acid groups are neutralised with sodium ions.

The specific charge of the anionically charged comb polymer is −500 C/g measured at pH 8.

The intrinsic viscosity is 22 mL/g.

Calcium Carbonate A:

A calcium carbonate containing material is obtained by first autogeneously dry grinding 10 to 300 mm natural calcium carbonate rocks of Norwegian origin to a fineness corresponding to a $d_{50}$ value of between 42 to 48 μm, subsequent wet grinding this dry-ground product to a fineness corresponding to a $d_{50}$ value of about 8 μm, and then grinding in presence of 5400 ppm of the comb polymer A at 30 to 35° C. in water in a 1.4-liter vertical attritor mill (Dynomill MultiLab) by using zirconium oxide/zirconium silicate grinding beads (0.6-1.0 mm) at a weight solids content of about 66 wt.-%, based on the total weight of the slurry, until a $d_{50}$ value of 0.9 μm and a $d_{90}$ value of 2.1 μm was reached.

Calcium Carbonate B:

A calcium carbonate containing material is obtained by first autogeneously dry grinding 10 to 300 mm natural calcium carbonate rocks of Norwegian origin to a fineness corresponding to a $d_{50}$ value of between 42 to 48 μm, subsequent wet grinding this dry-ground product to a fineness corresponding to a $d_{50}$ value of about 8 μm, and then grinding in presence of 7100 ppm of the comb polymer B at 30 to 35° C. in water in a 1.4-liter vertical attritor mill (Dynomill MultiLab) by using zirconium oxide/zirconium silicate grinding beads (0.6-1.0 mm) at a weight solids content of about 74 wt.-%, based on the total weight of the slurry, until a $d_{50}$ value of 0.76 μm and a $d_{90}$ value of 2.0 μm was reached.

Calcium Carbonate C:

It is the commercially available aragonitic PCC Omyaprime® HO40-GO 72% from Omya.

Calcium Carbonate D:

It is a MCC from Omya.

Calcium Carbonate E:

It is the commercially available PCC Omyajet® C4440-GO 38% from Omya.

Calcium Carbonate F:

It is the commercially available GCC Hydrocarb® 90-ME 78% from Omya.

Calcium Carbonate G:

It is the commercially available PCC Omyajet® B5260-GO 25% from Omya.

Calcium Chloride:

available from Sigma-Aldrich, Switzerland.

Binding Agents

Polyvinyl alcohol, available from CCP (Taiwan) as PVA BF-04.

Polyvinyl acetate, available from Wacker Chemie AG as Vinnacoat LL 4444.

Starch, available from Cargill, Switzerland as C*Film 07311.

Further Additives

Poly(DADMAC), available from BASF, Germany as Catiofast BP

Application

Composition were applied as 10 g/m² coating on Biberist Inkjet, 80 g/m², by using a rod coater Printer HP Officejet Pro8000 desktop printer with pigment based inks Zweckform 2585 was used as reference 2. Examples and Results This example demonstrates the optical and mechanical properties of a paper product coated with an aqueous calcium carbonate containing composition. The details regarding the compositions and the respective Brookfield viscosities (determined at 20° C. and 100 rpm) can be taken from Table 2.

|  | 1 [parts] | 2 [parts] | 3 [parts] | 4 [parts] | 5 [parts] | 6 [parts] | 7 [parts] |
| --- | --- | --- | --- | --- | --- | --- | --- |
| Calcium carbonate B |  | 60 | 60 | 60 |  |  |  |
| Calcium carbonate C | 75 |  |  |  | 75 | 75 |  |
| Calcium carbonate D |  | 40 | 40 | 40 |  |  | 40 |
| Calcium carbonate E | 25 |  |  |  |  |  |  |
| Calcium carbonate F |  |  |  |  |  |  | 60 |
| Calcium carbonate G |  |  |  |  | 25 | 25 |  |
| Comb polymer A |  |  |  |  |  |  | 2 |
| Comb polymer B |  | 0.2 | 0.2 | 0.2 | 0.6 | 0.6 |  |
| Polyvinyl alcohol | 5 | 5 | 5 | 5 | 5 | 5 | 5 |
| Starch | 2 | 2 | 2 | 2 | 2 | 2 | 2 |
| Poly(DADMAC) | 5 | 5 | 5 | 5 | 5 |  | 5 |
| Calcium chloride |  | 10 |  | 10 | 10 | 10 | 10 |
| color start |  |  |  |  |  |  |  |
| Solids content start [wt.-%] | 54.3 | 56.5 | 53.3 | 52.7 | 56.4 | 56.6 | 56.2 |
| Viscosity at 100 rpm [mPa * s] | 6000 | 1600 | 690 | 880 | 2300 | 1200 | 3020 |
| color end |  |  |  |  |  |  |  |
| Solids content end [wt.-%] | 37.5 | 35.6 | 35.3 | 35.5 | 35.5 | 36.1 | 35.0 |
| Viscosity at 100 rpm [mPa * s] | 660 | 65 | 67 | 70 | 72 | 50 | 90 |

Figure 2:
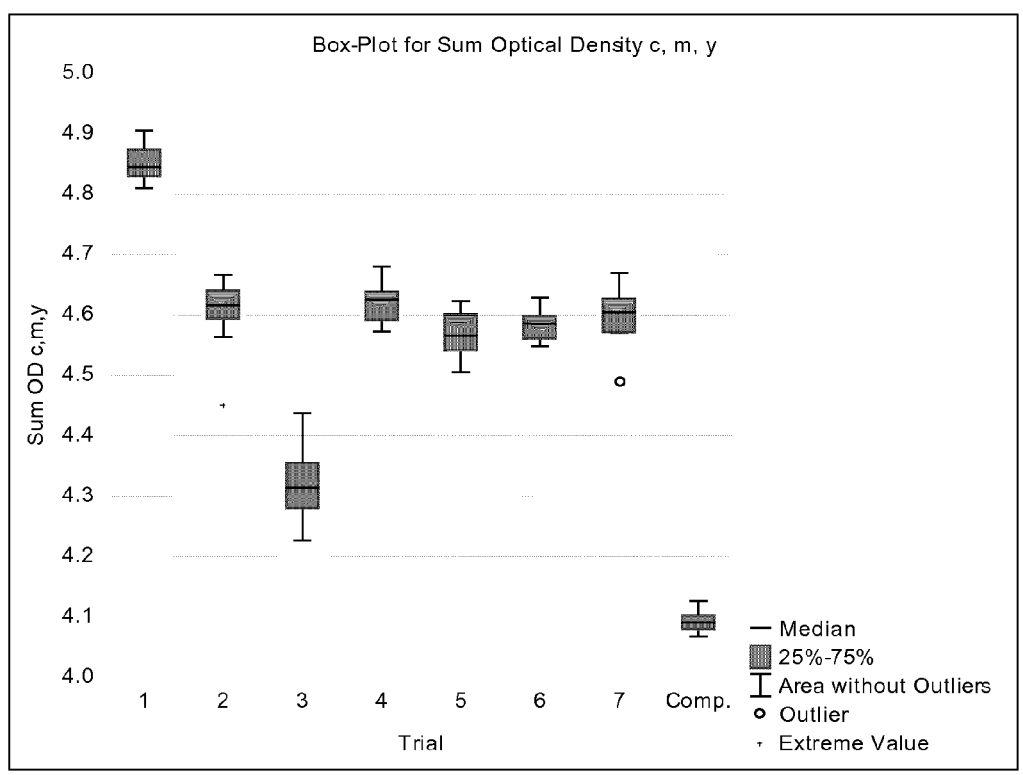
FIG. 2 outlines the optical density of colour (CMY) of a coated paper product prepared from the inventive aqueous calcium carbonate containing composition.

The effect of the aqueous calcium carbonate containing compositions on the optical density of black and colour of a coated paper product prepared therefrom is outlined in FIGS. 1 and 2. From FIGS. 1 and 2 it can be concluded that the addition of a salt of a divalent or trivalent cation is highly beneficial for colour inks. It can be further gathered that for black ink no salt of a divalent or trivalent cation is required. However, it has to be assumed that the inventive aqueous calcium carbonate containing composition impart positive effects on the optical and mechanical properties of paper end products coated with such composition.

Figure 3:
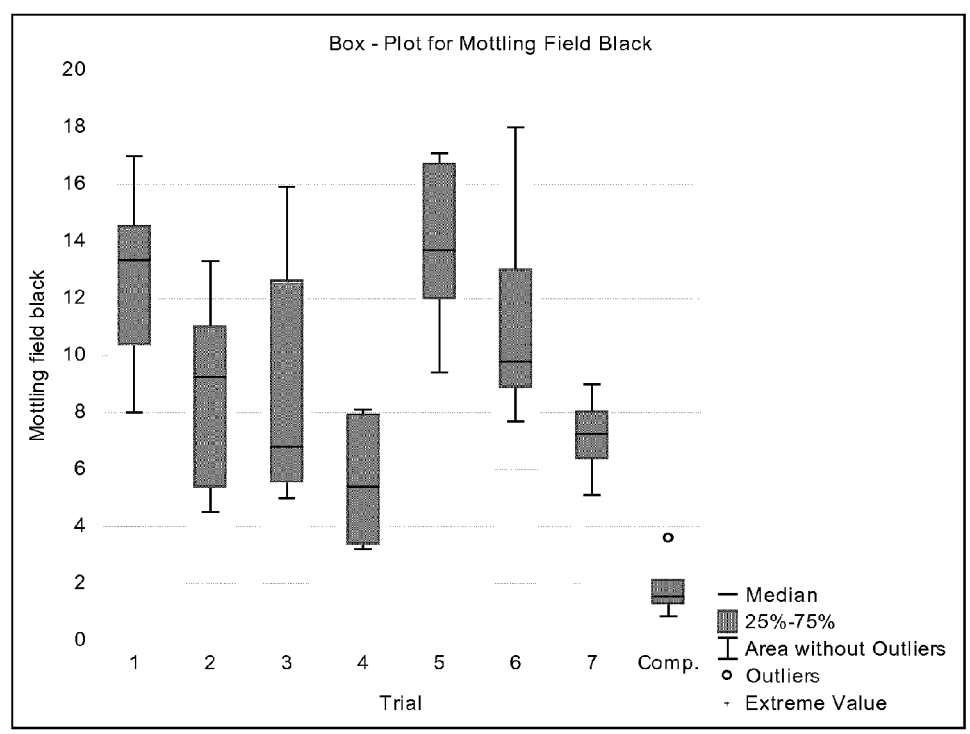
FIG. 3 outlines the mottling for black ink of a coated paper product prepared from the inventive aqueous calcium carbonate containing composition.
Figure 4:
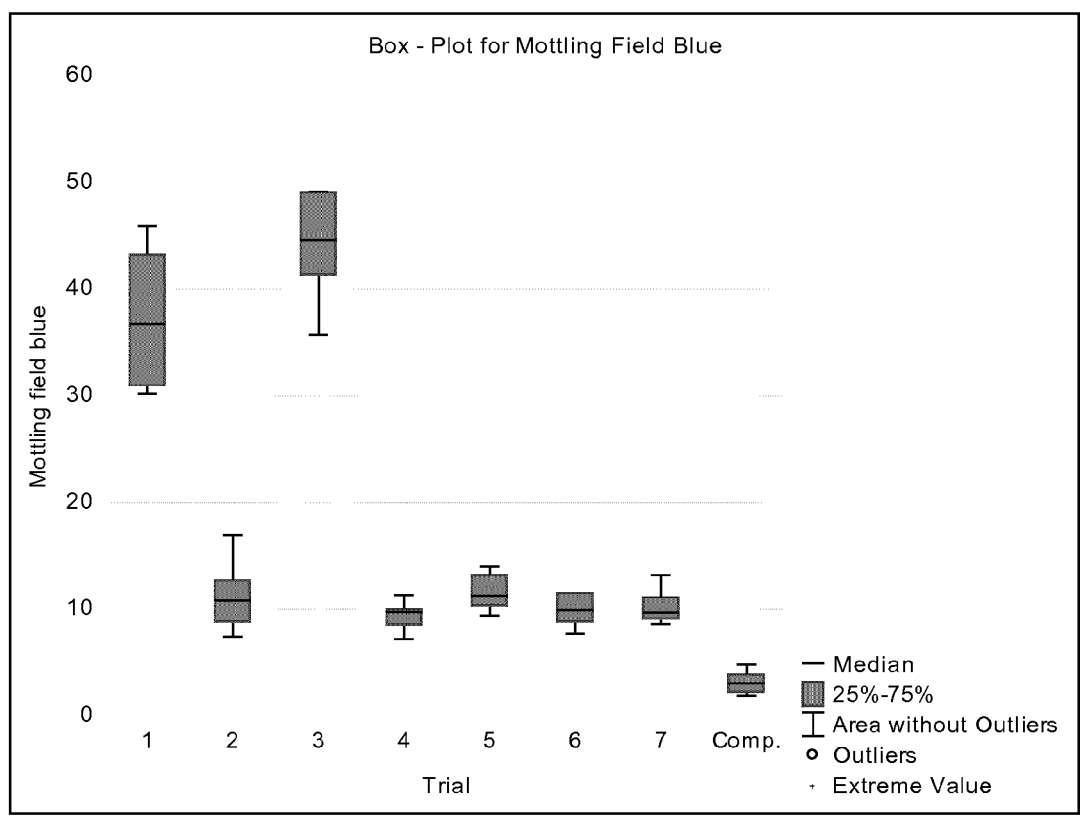
FIG. 4 outlines the mottling for colour (blue) ink of a coated paper product prepared from the inventive aqueous calcium carbonate containing composition.

The biggest issue with the print quality when coated with prior art compositions is the mottling, especially with color inks. The effect of the aqueous calcium carbonate containing compositions on mottling for black and colour ink of a coated paper product prepared therefrom is outlined in FIGS. 3 and 4. From FIGS. 3 and 4 it can be clearly gathered that the addition of a salt of a divalent or trivalent cation significantly improves the mottling and all trial points for the salt of a divalent or trivalent cation are on an acceptable level. Thus, it has to be assumed that the inventive aqueous calcium carbonate containing composition impart positive effects on the optical and mechanical properties of paper end products coated with such composition.

The invention claimed is:

1. An aqueous calcium carbonate containing composition comprising
   a) a calcium carbonate containing material in an amount of at least 10 wt.-%, based on the total dry weight of the composition,
   b) at least one anionically charged comb polymer having a specific charge of −5 to −500 C/g at pH 8,
   c) optionally at least one binding agent in an amount of at least 2.5 wt.-%, based on the total dry weight of the composition, and
   d) at least one salt of a divalent or trivalent cation in an amount of between 1 and 20 wt.-%, based on the total dry weight of the composition, whereby at least 95 wt.-% of the total amount of salt is dissolved within the composition, and
   wherein the composition has a Brookfield viscosity of below 2500 mPa·s when measured 1 minute after stirring at a rotational speed of 100 rpm at a temperature of 25° C.

2. The aqueous calcium carbonate containing composition of claim 1, wherein the at least one anionically charged comb polymer has an average molecular weight $M_W$ in the range between 10,000 and 10,000,000 g/mol.

3. The aqueous calcium carbonate containing composition of claim 1, wherein the at least one anionically charged comb polymer has an intrinsic viscosity in the range of 5 to 500 ml/g.

4. The aqueous calcium carbonate containing composition of claim 1, wherein the at least one anionically charged comb polymer has a specific charge from −10 C/g to −500 C/g at pH 8.

5. The aqueous calcium carbonate containing composition of claim 1, wherein the at least one anionically charged comb polymer comprises structural units of formula (I)

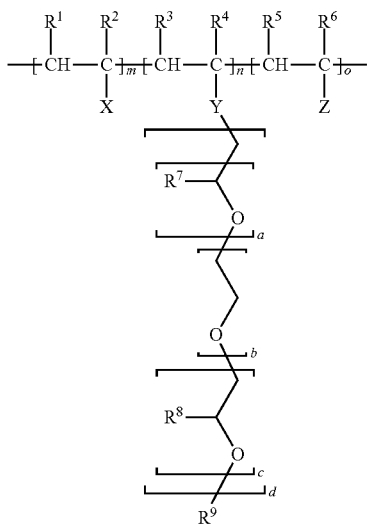

(I)

wherein $R^1$, $R^2$, $R^3$, $R^4$, $R^5$ and $R^6$ are independently selected from hydrogen or alkyl groups, having 1 to 40 carbon atoms, X is a negatively charged functional group, Y represents a functional linkage group, which is independently selected from the group consisting of ether, ester, urethane and amide groups, Z is a positively charged functional group, $R^7$ and $R^8$ are independently selected from hydrogen or alkyl groups having 1 to 4 carbon atoms, $R^9$ is selected from hydrogen or an alkyl group having 1 to 40 carbon atoms, a, b, c and d are integers such that $5 \leq (a+b+c) \cdot d \leq 150$, and n, m and o are selected such that the anionically charged polymer has a specific charge from −5 C/g to −500 C/g at pH 8.

6. The aqueous calcium carbonate containing composition of claim 1, wherein the at least one anionically charged comb polymer comprises a) 5 wt.-% to 40 wt.-%, based on the total amount of monomers, of (meth)acrylic acid, b) 60 wt.-% to 95 wt.-%, based on the total amount of monomers, of at least one monomer of Formula (II)

wherein R is a polymerizable functional group selected from methacrylate or methacryl-urethane, OE and OP designates ethylene oxide and propylene oxide, respectively, α and β are integers each having a value from 0 to 150 and at least one of α or β has a value of greater than 0, R' represents hydrogen or an alkyl group having 1 to 4 carbon atoms.

7. The aqueous calcium carbonate containing composition of claim 1, wherein the at least one anionically charged comb polymer comprises a) 5 wt.-% to 20 wt.-%, based on the total amount of monomers, of (meth)acrylic acid, b) 80 wt.-% to 95 wt.-%, based on the total amount of monomers, of at least one monomer of Formula (II)

wherein R is a polymerizable functional group selected from methacrylate or methacryl-urethane, OE and OP designates ethylene oxide and propylene oxide, respectively, α and β are integers each having a value from 0 to 150 and at least one of α or β has a value of greater than 0, R' represents hydrogen or an alkyl group having 1 to 4 carbon atoms.

8. The aqueous calcium carbonate containing composition of claim 1, wherein the composition comprises the at least one anionically charged comb polymer in an amount from 0.01 to 10 wt.-%, based on the total dry weight of the composition.

9. The aqueous calcium carbonate containing composition of claim 1, wherein the composition comprises the at least one anionically charged comb polymer in an amount from 0.15 to 1.75 wt.-%, based on the total dry weight of the composition.

10. The aqueous calcium carbonate containing composition of claim 1, wherein the calcium carbonate containing material is a ground calcium carbonate, a precipitated calcium carbonate, a modified calcium carbonate or a mixture thereof.

11. The aqueous calcium carbonate containing composition of claim 1, wherein the calcium carbonate containing material has a weight median particle size $d_{50}$ from 0.1 to 100 μm.

12. The aqueous calcium carbonate containing composition of claim 1, wherein the calcium carbonate containing material has a weight median particle size $d_{50}$ from 0.4 to 3.0 μm.

13. The aqueous calcium carbonate containing composition of claim 1, wherein the composition comprises the calcium carbonate containing material in an amount from 10 to 70 wt.-%, based on the total dry weight of the composition.

14. The aqueous calcium carbonate containing composition of claim 1, wherein the binding agent is selected from the group consisting of polyvinyl alcohol, polyvinyl acetate, starch, proteins, casein, cellulose, cellulosic derivatives, ethylhydroxyethyl cellulose and/or carboxymethyl cellulose, and any mixture thereof.

15. The aqueous calcium carbonate containing composition of claim 1, wherein the binding agent is preferably the binding agent is selected from the group consisting of polyvinyl alcohol, polyvinyl acetate, and mixtures thereof.

16. The aqueous calcium carbonate containing composition of claim 1, wherein the composition comprises the at least one binding agent in an amount between 2.5 and 20 wt.-%, based on the total dry weight of the composition.

17. The aqueous calcium carbonate containing composition of claim 1, wherein the at least one salt of a divalent or trivalent cation is selected from the group consisting of a chloride salt of a divalent or trivalent cation, a bromide salt of a divalent or trivalent cation, a sulfate salt of a divalent or trivalent cation, and any mixture thereof.

18. The aqueous calcium carbonate containing composition of claim 1, wherein the at least one salt of a divalent or trivalent cation is a chloride salt of a divalent or trivalent cation selected from the group consisting of calcium chloride, magnesium chloride, strontium chloride, zinc chloride, manganese chloride, and any mixture thereof.

19. The aqueous calcium carbonate containing composition of claim 1, wherein the composition comprises the at least one salt of a divalent or trivalent cation in an amount of between 3 and 17 wt.-%, based on the total dry weight of the composition, whereby at least 95 wt.-% of the total amount of salt is dissolved within the composition.

20. The aqueous calcium carbonate containing composition of claim 1, wherein the composition comprises one or more further additives, fixation aids, or cationic homopolymers based on monomer units of diallyl dialkyl ammonium salts or polyethylene imines.

21. The aqueous calcium carbonate containing composition of claim 1, wherein the composition has a solids content from 10 to 70 wt.-%, based on the total dry weight of the composition.

22. The aqueous calcium carbonate containing composition of claim 1, wherein the Brookfield viscosity of the composition is from 50 to 2500 mPa·s when measured 1 minute after stirring at a rotational speed of 100 rpm at a temperature of 25° C.

23. The aqueous calcium carbonate containing composition of claim 1, wherein the Brookfield viscosity of the composition is from 25 to 2000 mPa·s when measured 1 minute after stirring at a rotational speed of 100 rpm at a temperature of 25° C.

24. A method for producing an aqueous calcium carbonate containing composition as defined in claim 1, comprising the steps of
   a) providing water,
   b) providing the calcium carbonate containing material,
   c) providing the at least one anionically charged comb polymer having a specific charge of −5 to −500 C/g at pH 8,
   d) optionally providing the at least one binding agent in an amount of at least 2.5 wt.-%, based on the total dry weight of the composition,
   e) providing the at least one salt of a divalent or trivalent cation in an amount of between 1 and 20 wt.-%, based on the total dry weight of the composition,
   f) contacting the calcium carbonate containing material of step b) with the water of step a),
   g) contacting the calcium carbonate containing material of step b) with the at least one anionically charged comb polymer of step c) before and/or during and/or after step f),
   h) optionally contacting the calcium carbonate containing material of step b) with the at least one binding agent of step d) before and/or during and/or after step f) and/or before and/or during and/or after step g), and
   i) contacting the calcium carbonate containing material of step b) with the at least one salt of a divalent or trivalent cation of step e) before or after step g).

25. The method of claim 24, wherein the composition has a solids content from 10 to 70 wt.-%, based on the total dry weight of the composition.

26. The method of claim 24, wherein the Brookfield viscosity of the composition is from 50 to 2500 mPa·s when measured 1 minute after stirring at a rotational speed of 100 rpm at a temperature of 25° C.

27. The method of claim 24, wherein the Brookfield viscosity of the composition is from 25 to 2000 mPa·s when measured 1 minute after stirring at a rotational speed of 100 rpm at a temperature of 25° C.

28. A method for producing an aqueous calcium carbonate containing composition as defined in claim 1, comprising the steps of
   a) providing water,
   b) providing the calcium carbonate containing material,
   c) providing the at least one anionically charged comb polymer having a specific charge of −5 to −500 C/g at pH 8,
   d) optionally providing the at least one binding agent in an amount of at least 2.5 wt.-%, based on the total dry weight of the composition,
   e) providing the at least one salt of a divalent or trivalent cation in an amount of between 1 and 20 wt.-%, based on the total dry weight of the composition,
   f) combining the water of step a), the calcium carbonate containing material of step b) and the at least one anionically charged comb polymer of step c) in any order to form a suspension,
   g) dispersing and/or grinding the suspension obtained in step f),
   h) optionally contacting the calcium carbonate suspension obtained in step g) with the at least one binding agent of step d),
   i) contacting the calcium carbonate suspension obtained in step g) with the at least one salt of a divalent or trivalent cation of step e) after step g) or contacting the calcium carbonate suspension of step h) with the at least one salt of a divalent or trivalent cation of step e) after step h).

29. A method for producing an aqueous calcium carbonate containing composition as defined in claim 1, comprising the steps of
   a) providing water,
   b) providing the calcium carbonate containing material,
   c) providing the at least one anionically charged comb polymer having a specific charge of −5 to −500 C/g at pH 8,
   d) providing the at least one salt of a divalent or trivalent cation in an amount between 10 to 50 wt.-%, based on the total dry weight of the at least one anionically charged comb polymer of step c),
   e) optionally providing the at least one binding agent in an amount of at least 2.5 wt.-%, based on the total dry weight of the composition,
   f) combining the at least one anionically charged comb polymer of step c) and the at least one salt of a divalent or trivalent cation of step d),
   g) contacting the calcium carbonate containing material of step b) with the water of step a),
   h) contacting the calcium carbonate containing material of step b) with the at least one anionically charged comb polymer of step f) before and/or during and/or after step g),
   i) optionally contacting the calcium carbonate containing material of step b) with the at least one binding agent of step e) before and/or during and/or after step g) and/or before and/or during and/or after step h).

30. A method for producing an aqueous calcium carbonate containing composition as defined in claim 1, comprising the steps of
   a) providing water,
   b) providing the calcium carbonate containing material,
   c) providing the at least one anionically charged comb polymer having a specific charge of −5 to −500 C/g at pH 8,
   d) providing the at least one salt of a divalent or trivalent cation in an amount between 10 to 50 wt.-%, based on the total dry weight of the at least one anionically charged comb polymer of step c),
   e) optionally providing the at least one binding agent in an amount of at least 2.5 wt.-%, based on the total dry weight of the composition,
   f) combining the at least one anionically charged comb polymer of step c) and the at least one salt of a divalent or trivalent cation of step d), g) combining the water of step a), the calcium carbonate containing material of step b) and the at least one anionically charged comb polymer of step f) in any order to form a suspension, h) dispersing and/or grinding the suspension obtained in step g), i) optionally contacting the calcium carbonate suspension of step h) with the at least one binding agent of step e).

31. A paper coating, plastic and/or paint comprising the aqueous calcium carbonate containing composition of claim 1.

32. A paper filler comprising the aqueous calcium carbonate containing composition of claim 1.

* * * * *